United States Patent
Song et al.

(10) Patent No.: US 12,253,745 B2
(45) Date of Patent: *Mar. 18, 2025

(54) SILICON PHOTONIC DEVICE WITH BACKUP LIGHT PATHS

(71) Applicant: Taiwan Semiconductor Manufacturing Co., Ltd., Hsinchu (TW)

(72) Inventors: Weiwei Song, San Jose, CA (US); Stefan Rusu, Sunnyvale, CA (US); Chan-Hong Chern, Palo Alto, CA (US); Chih-Chang Lin, San Jose, CA (US)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/363,489

(22) Filed: Aug. 1, 2023

(65) Prior Publication Data

US 2023/0375862 A1  Nov. 23, 2023

Related U.S. Application Data

(63) Continuation of application No. 17/379,620, filed on Jul. 19, 2021, now Pat. No. 11,841,561.

(Continued)

(51) Int. Cl.
  *G02F 1/01* (2006.01)
  *G02F 1/025* (2006.01)
  *G02F 1/225* (2006.01)

(52) U.S. Cl.
  CPC ............ *G02F 1/025* (2013.01); *G02F 1/2255* (2013.01); *G02F 1/2257* (2013.01); *G02F 2201/508* (2013.01); *G02F 2201/58* (2013.01)

(58) Field of Classification Search
  CPC ........ G02F 1/025; G02F 1/225; G02F 1/2255; G02F 1/2257; G02F 2201/506; G02F 2201/508; G02F 2201/58; G02F 2203/20
  (Continued)

(56) References Cited

U.S. PATENT DOCUMENTS 8,660,390 B2   2/2014   McLaren et al.
8,987,059 B2   3/2015   Liang et al.
(Continued)

FOREIGN PATENT DOCUMENTS

CN   105452921 B   3/2019
TW   202036135 A   10/2020

OTHER PUBLICATIONS

Zheng et al., "Power-Efficient Calibration and Reconfiguration for Optical Network-on-Chip," Optical Society of America, vol. 4, No. 12, Dec. 2012, 12 pages.

*Primary Examiner* — Robert Tavlykaev
(74) *Attorney, Agent, or Firm* — Slater Matsil, LLP

(57) ABSTRACT

A semiconductor device include: a first bus waveguide; a first silicon ring optically coupled to the first bus waveguide; a backup silicon ring optically coupled to the first bus waveguide; a first heater and a second heater configured to heat the first silicon ring and the backup silicon ring, respectively; and a first switch, where the first switch is configured to electrically couple the first silicon ring to a first radio frequency (RF) circuit when the first switch is at a first switching position, and is configured to electrically couple the backup silicon ring to the first RF circuit when the first switch is at a second switching position.

20 Claims, 14 Drawing Sheets

Related U.S. Application Data

(60) Provisional application No. 63/178,102, filed on Apr. 22, 2021.

(58) Field of Classification Search
USPC .......................................................... 385/1–3
See application file for complete search history.

(56) References Cited

U.S. PATENT DOCUMENTS

| | | |
|---|---|---|
| 9,040,334 B2 | 5/2015 | Chu et al. |
| 9,065,358 B2 | 6/2015 | Tsai et al. |
| 9,085,455 B2 | 7/2015 | Cheng et al. |
| 9,085,456 B2 | 7/2015 | Tsai et al. |
| 9,122,827 B2 | 9/2015 | Chen et al. |
| 9,133,017 B2 | 9/2015 | Liang et al. |
| 9,138,994 B2 | 9/2015 | Peng et al. |
| 9,139,420 B2 | 9/2015 | Chang et al. |
| 9,139,423 B2 | 9/2015 | Chien et al. |
| 9,181,083 B2 | 11/2015 | Tsai et al. |
| 9,187,317 B2 | 11/2015 | Cheng et al. |
| 9,233,839 B2 | 1/2016 | Liu et al. |
| 9,236,877 B2 | 1/2016 | Peng et al. |
| 9,238,581 B2 | 1/2016 | Wu et al. |
| 9,389,365 B2 | 7/2016 | Nicholson et al. |
| 10,215,925 B1 | 2/2019 | Knights et al. |
| 10,297,981 B2 | 5/2019 | Bovington et al. |
| 10,432,315 B2 | 10/2019 | Chen et al. |
| 10,551,717 B2 | 2/2020 | Ma et al. |
| 11,063,671 B2 | 7/2021 | Young et al. |
| 11,442,228 B2 | 9/2022 | Nahmias |
| 2014/0287548 A1 | 9/2014 | Lin et al. |
| 2015/0137303 A1 | 5/2015 | Chou et al. |
| 2015/0175405 A1 | 6/2015 | Cheng |
| 2015/0175407 A1 | 6/2015 | Cheng et al. |
| 2015/0196912 A1 | 7/2015 | Tsai et al. |
| 2015/0316796 A1* | 11/2015 | Gill ........................ G02F 1/225 385/2 |
| 2015/0381277 A1 | 12/2015 | Shimizu et al. |
| 2016/0112118 A1 | 4/2016 | Rahn et al. |
| 2019/0379453 A1 | 12/2019 | Toda et al. |

\* cited by examiner

SILICON PHOTONIC DEVICE WITH BACKUP LIGHT PATHS

PRIORITY CLAIM AND CROSS-REFERENCE

This application is a continuation of U.S. patent application Ser. No. 17/379,620, filed Jul. 19, 2021 and entitled "Silicon Photonic Device with Backup Light Paths," which claims the benefit of the U.S. Provisional Application No. 63/178,102, filed Apr. 22, 2021 and entitled "Modulator with Compact Backup Light Paths," which applications are hereby incorporated herein by reference.

BACKGROUND

Optical communication has been used in telecommunication applications. For example, fiber optical cables have been used as the backbone network for transmitting high-speed data. In the last decade, optical communication has made way into data communication, e.g., rack-to-rack communication in data centers. Currently, optical communication for rack-to-rack communication may be used for distance between, e.g., about 10 meters and about 2,000 meters.

With the rapid increase in data rates within or between semiconductor chips, optical communication may be employed in chip-to-chip communication in high performance semiconductor devices. Photonic integrated circuits (ICs) (also referred to as silicon photonic devices, photonic devices, photonic dies, photonic chips, or optical integrated dies) provide the ability to transmit, receive, and/or process light signals in much the same way that traditional integrated devices transmit, receive and/or process electrical signals, but at much higher data rate.

Conventional optical modulators have large sizes, consume significant power to operate, and are expensive to manufacture. There is a need in the art for silicon photonic devices with integrated optical modulators having small size, lower power consumption, and high reliability.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
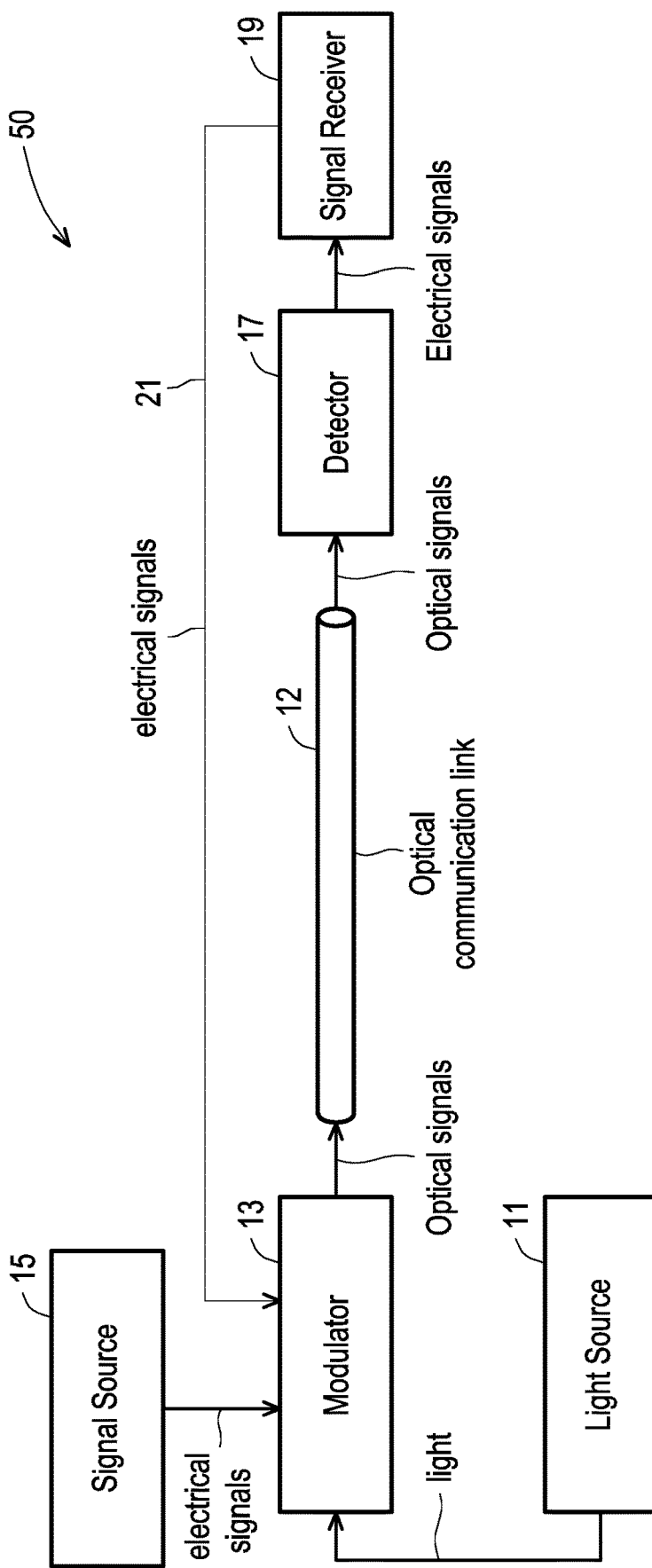
FIG. 1 illustrates a block diagram of an optical communication system, in an embodiment.

The following disclosure provides many different embodiments, or examples, for implementing different features of the invention. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact.

Further, spatially relative terms, such as "underlying," "below," "lower," "overlying," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. Throughout the description herein, unless otherwise specified, the same or similar reference numerals in different figures refer to the same or similar element formed by a same or similar formation method using a same or similar material(s).

In accordance with an embodiment, a ring modulator has a primary ring and a backup ring that are optically coupled to a bus waveguide. Each of the primary ring and the backup ring has a respective heater. The heater can be controlled to heat the respective ring (e.g., the primary ring or the backup ring) to a target temperature. The resonant wavelengths of the primary ring and the backup ring are tunable by adjusting their temperatures. During operation of the ring modulator, the primary ring is heated to a first temperature such that the resonant wavelength of the primary ring matches the operating wavelength of the ring modulator, and the backup ring is heated to a different second temperature such that the resonant wavelength of the backup ring differs from the operating wavelength of the ring modulator. If failure of the primary ring is detected, the primary ring is deactivated by heating it to the second temperature, and the backup ring is activated to replace the primary ring, which is achieved by heating the backup ring to a third temperature such that the resonant wavelength of the backup ring matches the operating wavelength of the ring modulator. The third temperature may be the same as the first temperature. During device testing of the manufacturing process, if the primary ring is found to be defective, the backup ring of the device can be tuned (e.g., by tuning its temperature) to replace the primary ring, and the device can still be used. Therefore, by having the backup ring as redundancy, device production yield is improved. In addition, after the device is deployed in the field, if the primary ring fails, the backup up can be activated to replace the primary ring. This reduces the product failure rate, and the cost to replace the device is saved.

FIG. 1 illustrates a block diagram of an optical communication system 50, in an embodiment. The optical communication system 50 includes a modulator 13 (e.g., an optical modulator), a light source 11, a signal source 15, an optical communication link 12, a detector 17, and a signal receiver 19. The light source 11 produces a light signal (e.g., a laser beam) having a pre-determined wavelength, which light signal is sent to the modulator 13. The modulator 13 modulates the light signal using an electrical signal from the signal source 15. The signal source 15 may include circuits for producing the electrical signal (e.g., a radio frequency (RF) signal) carrying digital information, and the electrical signal is then used to modulate the light signal. The signal source 15 may include functional blocks such as error correction coding, modulation, filtering, up-sampling, analog-to-digital conversion (ADC), and RF processing blocks, as examples. The light signal may be modulated by the modulator 13 through, e.g., amplitude modulation (AM), phase modulation (PM), polarization modulation, or the like. The modulated light signal is transmitted through the optical communication link 12 (e.g., a fiber optical cable), and is converted into an electrical signal by the detector 17 (e.g., an optical detector) at the receiver end. The output of the detector 17 is then sent to the signal receiver 19, which recovers the transmitted digital information using the electrical signal from the detector 17. The signal receiver 19 may include functional blocks such as demodulation, decoding, error correction, as examples.

FIG. 1 further illustrates a feedback path 21 (e.g., one or more electrically conductive paths), which may be used for transmitting control information and/or measurement information from the signal receiver 19 to the modulator 13 for controlling (e.g., fine tuning, or close-loop control) the operation of the modulator 13. For example, the signal receiver 19 may provide an indicator of the received signal quality, such as bit error rate (BER) measurement, a signal-to-noise ratio (SNR) measurement, or a measurement of the eye-opening in the eye-diagram of the demodulated signal at the signal receiver 19. The modulator 13 may adjust its parameters (e.g., resonant wavelength, or heating power) to optimize or improve the received signal quality at the signal receiver 19.

In some embodiments, the modulator 13 and the signal source 15 may be formed in a first silicon photonic chip for modulating a light signal, and the detector 17 and signal receiver 19 may be formed in a second silicon photonic chip for demodulating/decoding the modulated light signal. In some embodiments, a silicon photonic chip may include the modulator 13 and the signal source 15 for modulating/transmitting optical signal, and additionally, may include the detector 17 and signal receiver 19 for receiving/decoding optical signal. The present disclosure discloses various embodiments of the modulator 13 (e.g., various silicon ring modulators) that are suitable for integration in silicon photonic circuits (e.g., semiconductor devices such as integrated circuits). Although the disclosed embodiments are for optical modulation, the principle disclosed herein may also be applied to optical demodulation, as skilled artisans readily appreciate.

Silicon photonic devices are widely used in high speed transceivers and other photonic systems. Conventionally, Mach-Zehnder Modulators (MZMs), Arrayed Waveguide Gratings (AWGs), and other optical devices, which have large sizes, are used in silicon photonic devices. The use of MZMs and AWGs results in large chip size and high manufacturing cost. For example, an MZM may have a typical size of about 2 $mm^2$. The beginning of the use of MZMs pre-dated the advent of silicon photonic devices. As such, properties of MZMs may not be optimal for integration in silicon photonic devices. The large size of MZMs may be attributable to the relatively weak electro-optic (EO) effect in silicon. To make up for the weakness of EO effect in silicon, MZMs tend to have a large size. Due to the large size and high cost of MZMs, conventional optical devices are often built without any redundant element (e.g., redundant MZMs) as a backup. However, without redundancy, failure in a single key element of the optical device may cause the whole optical device to fail, which may decrease the production yield and increase the average product cost. In addition, without any redundant element, it is difficult to add/remove optical element in a photonic link.

Silicon photonic circuits are becoming increasingly complicated with higher integration density, more performance constraints, and tighter power budget. These factors may lead to a significant yield degradation in production and increased product failure rates after deployment for various reasons, some of which are discussed below.

One reason is that photonic devices are process sensitive. A small process variation may lead to large performance deviation from the design target, which means a possibly higher failure rate. The "process variation" manifests itself often in the size (e.g., physical size) deviation of a manufactured layout element from the intended/design value. For example, the operating wavelength of a waveguide may depend on the width of the waveguide. If the width of the waveguide changes by 1 nm, then the operating wavelength of the waveguide may shift by 1 nm. In some optical applications, a shift of 1 nm may be sufficient to degrade performance of the optical modulator or even makes the modulator fail. A possible source of size deviation is non-ideal etching. Non-idealities in photolithography is another example. In general, photonic devices may be more process sensitive than logic devices, partially because optical signals are more sensitive than electric signals.

Another reason for yield degradation and/or product failure rates is that in a typical optical device, the system-level performance depends on the performance of each element in the photonic link. One failed element in the photonic link may directly lead to the failure of the whole system. Yet another reason is that after a long time of deployment, the devices may have degraded performance or may even be damaged, due to, e.g., component aging and/or environment factors such as moisture penetration and oxidation.

Various embodiment optical devices are discussed herein, which overcome or alleviate the yield degradation and product failure rates issues discussed above, and are well suited for implementation in silicon photonic devices. The disclosed embodiment optical devices have redundant optical modulators (e.g., silicon ring modulators) and multiple light signal paths, which allows for easy addition/removal of photonic elements in a photonic link, and allows for easy activation of the redundant optical modulator as a replacement if the primary optical modulator fails. The operating wavelengths of the optical devices are easily tunable. In addition, the disclosed optical devices can be fabricated with a small footprint (e.g., about 100 $\mu m^2$). Furthermore, due to its compact size and power efficient structure, multiple instances of the disclosed optical modulator may be formed in the silicon photonic circuit without significantly increasing the power consumption.

Figure 2A:
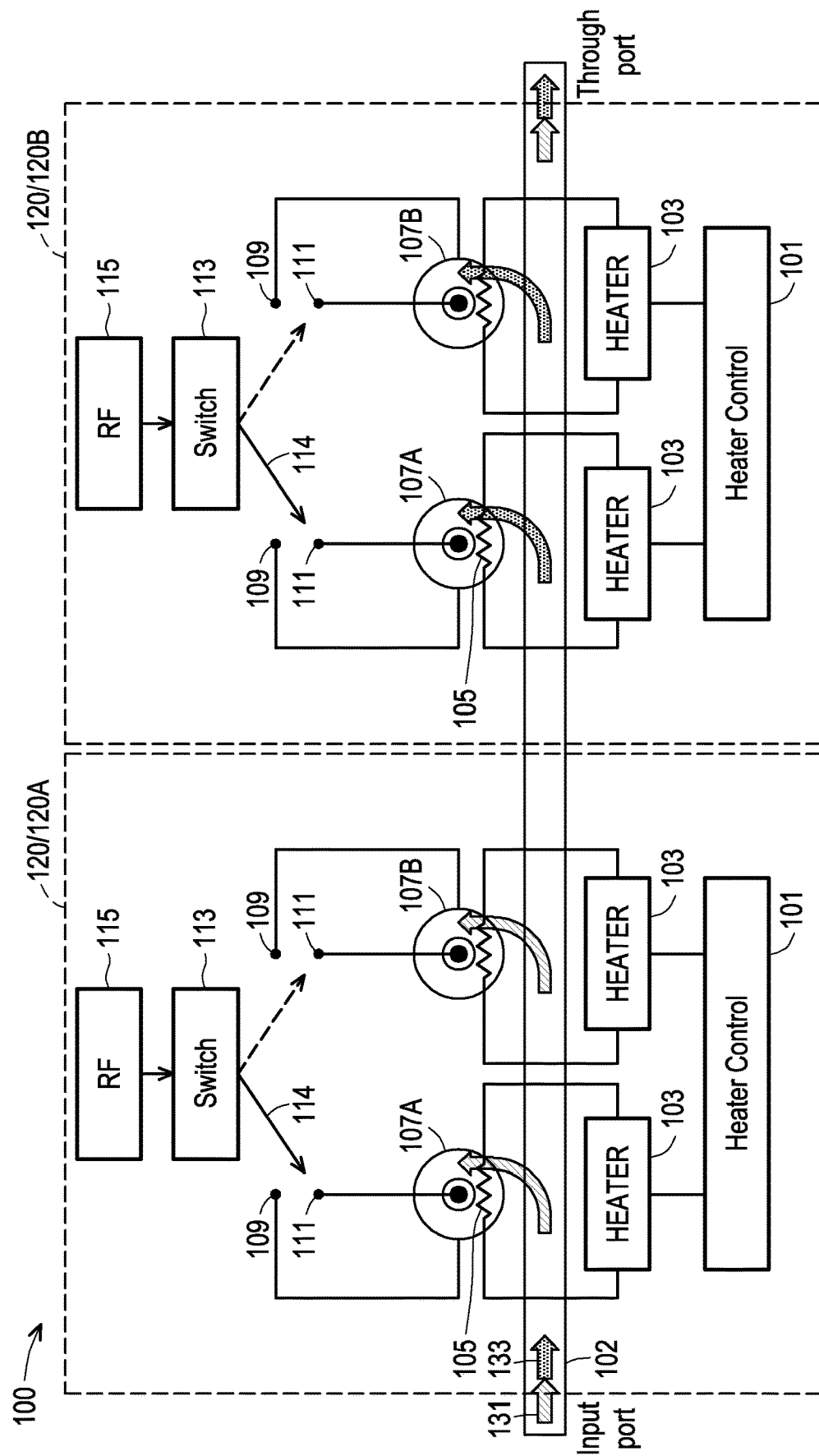
FIG. 2A illustrates a block diagram of a silicon photonic device, in an embodiment.

FIG. 2A illustrates a block diagram of a silicon photonic device 100, in an embodiment. Note that for simplicity, not all features of the silicon photonic device 100 are illustrated. In the example of FIG. 2A, the silicon photonic device 100 includes two silicon ring modulators 120 (e.g., 120A and 120B). The silicon ring modulators 120 (e.g., optical modulators) may also be referred to as ring modulators 120 herein. The silicon ring modulators 120 (e.g., 120A and 120B) have identical structures, but will be controlled differently to have different resonant wavelengths and are modulated by different modulating signals, as discussed in more details hereinafter.

As illustrated in FIG. 2A, each of the ring modulators 120 (e.g., 120A or 120B) includes a bus waveguide 102, a silicon ring 107A, and a silicon ring 107B. The silicon rings 107 (e.g., 107A and 107B) are optically coupled to the bus waveguide 102, and are also referred to as rings 107 in the discussion herein. In the illustrated embodiment, the rings 107 (e.g., 107A and 107B) have identical structures, and the ring 107A serves as a redundant ring (also referred to as a backup ring) of the ring 107A (also referred to as a primary ring). For example, if the ring 107A fails (e.g., malfunctions, or breaks down), the ring 107B may be activated to replace the functionalities of the ring 107A, details are discussed below.

The ring modulator 120 further includes a plurality of heaters 103 configured to heat the rings 107. In particular, each of the rings 107 has a corresponding heater 103. FIG. 2A further illustrates the heating element 105 (e.g., a resistor) of each heater 103. Besides the heating element 105, each of the heaters 103 may include other components, such as temperature sensor(s) for monitoring (e.g., measuring) the temperature of the corresponding ring 107, or voltage control circuit and/or current control circuit that control (e.g., adjust) the voltage across the heating element 105 and/or the current flowing through the heating element 105. In some embodiments, the voltage control circuit and/or the current control circuit of each heater 103 are used for adjusting the heating power of the heating element 105, and are controlled by a heater control unit 101 (e.g., a micro-controller, or a digital logic) of the ring modulator 120, such that a target temperature for each of the rings 107 is maintained during operation of the silicon photonic device 100. For example, a close-loop control may be performed, where the heater control unit 101 (also referred to as a heater control circuit) monitors the measured temperature of each of the rings 107, and issues different control commands to each of the heater 103 individually, such that the voltage control circuit and/or the current control circuit of each heater 103 adjusts the heating power of the heating element 105 accordingly to maintain a target temperature for each of the rings 107.

Still referring to FIG. 2A, each of the rings 107 has two contacts 109 and 111. One of the contacts 109/111 is electrically coupled to a P-doped region of the ring 107, and the other one of the contact 109/111 is electrically coupled to an N-doped region of the ring 107. The contacts 109 and 111 are configured to be coupled to a modulating signal (e.g., an RF signal generated by the RF circuit 115) for modulating the light signal in the ring 107. Details of the ring 107 and its electrical connections are discussed hereinafter with reference to FIGS. 7A-7C.

The ring modulator 120 further includes an RF circuit 115 and a switch 113. In some embodiments, the RF circuit 115 includes functional blocks for generating an RF signal that is modulated by digital information (e.g., digital data such as 0's and 1's). In other words, the RF circuit 115 outputs a modulated RF signal that carrier digital information. The modulated RF signal from the RF circuit 115 is then connected to the contacts 109/111 of each ring 107 through the switch 113. In some embodiments, the RF circuit 115 includes a plurality of functional blocks, such as error correction coding, digital modulation (e.g., digital constellation mapping), digital filtering, up-sampling, analog-to-digital conversion (ADC), analog modulation (e.g., mixing with carrier), and/or analog amplifier (e.g., low-noise RF amplifier). In some embodiments, the RF circuit 115 only includes analog signal processing blocks such as analog modulation and analog amplifier. In some embodiments, the RF circuit 115 only includes electrical contacts (e.g., contact pads) for connecting to an external RF source, such that the RF signal generated by the external RF device is sent to the switch 113 through the electrical contacts of the RF circuit 115.

Figure 2B:
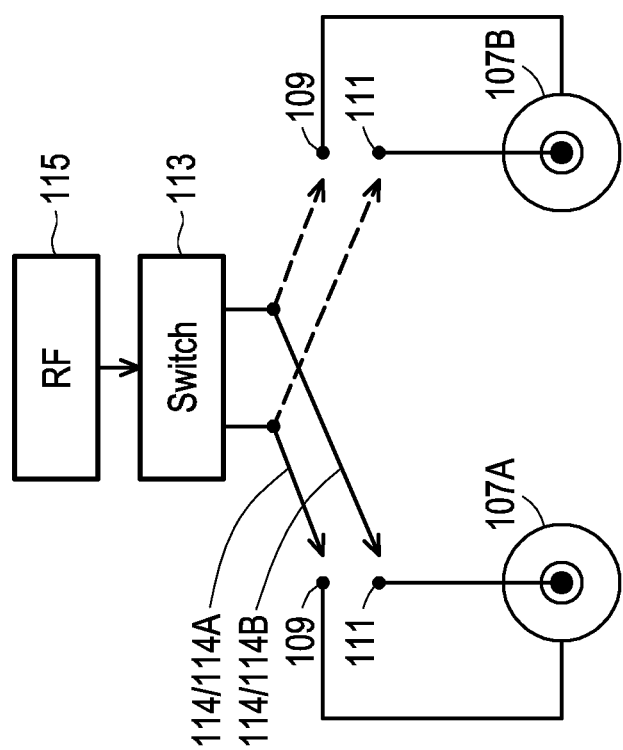
FIG. 2B illustrates the operation of a switch in the silicon photonic device of FIG. 2A, in an embodiment.

In the illustrated embodiment, the switch 113 functions as a double-pole double-throw switch. In particular, when the switch 113 is at a first switching position (e.g., the left-hand side position in FIG. 2A), the RF signal from the RF circuit 115 is electrically coupled to the contacts 109/111 of the ring 107A. When the switch 113 is at a second switching position (e.g., the right-hand position in FIG. 2A), the RF signal from the RF circuit 115 is electrically coupled to the contacts 109/111 of the ring 107B. Note that a switching arm 114 of the switch 113 is illustrated in FIG. 2A to schematically indicate the switching between the two switching positions of the switch 113. One skilled in the art will readily appreciate that the switch 113 may not have a mechanic switching arm 114, and the switch 113 may be any suitable type of switch, such as a plurality of transistors interconnected together and controlled by a control voltage to achieve the double-pole double-throw switching function. For simplicity, the switching arm 114 in FIG. 2A (and subsequent figures) is illustrated by a single line. FIG. 2B shows a more detailed view of the switching of the switch 113 in FIG. 2A, where the switching arm 114 is shown to have two conductive paths 114A and 114B for connecting to contacts 109 and 111 at each switching position.

Although not illustrated in FIG. 2A, power monitors for measuring the optical power of the light signal at certain locations (e.g., in the rings 107 or in the bus waveguide 102) of the ring modulators 120 may be formed in the silicon photonic device 100. Various types of power monitors and various locations for the power monitors are discussed below with reference to FIGS. 6A-6C, details are not discussed here.

The number of ring modulators 120 in FIG. 2A (and subsequent figures) is merely a non-limiting example, one skilled in the art will readily appreciate that any number of ring modulators 120 may be formed in the silicon photonic device 100. In addition, the word "silicon" is used in the terms "silicon photonic device," "silicon ring modulator," and "silicon ring" to simply indicate that the referred device/structure (e.g., the photonic device, the ring modulator, or the ring) is, or is part of, a semiconductor device formed using semiconductor manufacturing technologies, and does not limit the material of the referred device/structure to silicon (e.g., Si). The silicon photonic device, the silicon ring modulator, and the silicon ring may be formed using any suitable material.

Figure 3:
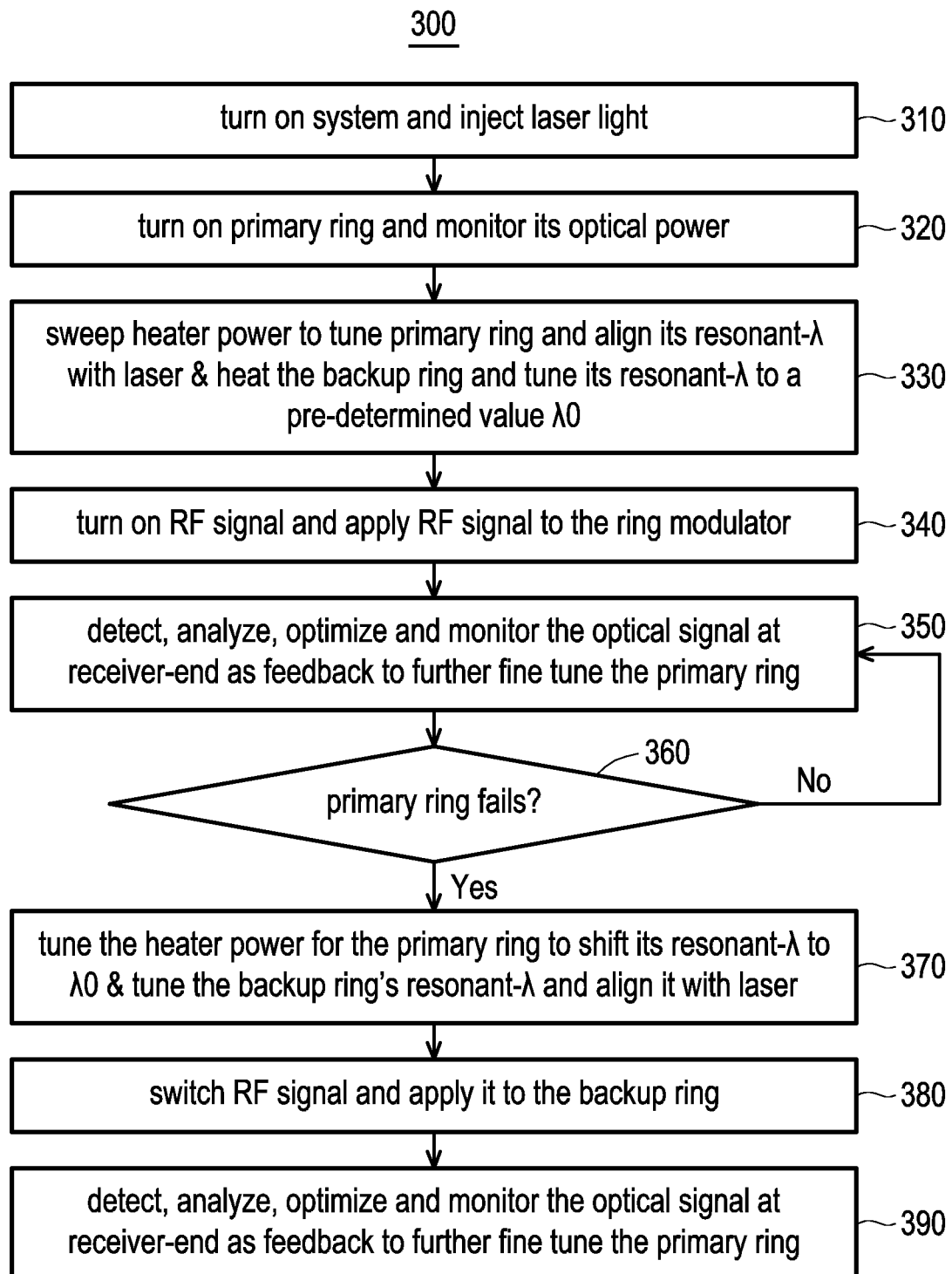
FIG. 3 illustrates a flow chart of a method of operating a silicon photonic device, in an embodiment.

FIG. 3 illustrates a flow chart of a method 300 of operating a silicon photonic device, in an embodiment. The method 300 may be used to operate the various embodiment silicon photonic devices (e.g., 100, 100A, 100B 100C, and 100D) disclosed herein. The method 300 may be performed when each time the device powers on, and/or when a real-time check is requested during operation of the device. Note that the method 300 describes the operation related to one of the ring modulators 120 in the silicon photonic device. If the silicon photonic device has more than one ring modulators 120, the method 300 can be applied to each of the ring modulators 120, as skilled artisans readily appreciate. As an example, the operation of the silicon photonic device 100 is described below with reference to FIGS. 2A and 3. Note that in the discussion herein, without loss of generality, it is assumed that the ring modulator 120A is configured to modulate a light signal 131 (e.g., a laser beam) having a wavelength $\lambda_1$, and the ring modulator 120B is configured to modulate a light signal 133 (e.g., a laser beam) having a wavelength $\lambda_2$. The wavelength $\lambda_1$ is referred to as the operating wavelength of the ring modulator 120A, and the wavelength $\lambda_2$ is referred to as the operating wavelength of the ring modulator 120B.

Referring to FIGS. 3 and 2A, at block 310, the system (e.g., the silicon photonic device 100) is turned on. The light signal 131 with wavelength $\lambda_1$ and the light signal 133 with wavelength $\lambda_2$ are injected into the bus waveguide 102 at an input port of the bus waveguide 102.

At block 320, the primary ring 107A of each ring modulator 120 (e.g., 120A, or 120B) is turned on and the optical power in the primary ring 107A is monitored, e.g., by a power monitor. The primary ring 107A is turned on by turning on the corresponding heater 103 (e.g., through the control of the heater control unit 101) and heating the primary ring 107A. Details regarding monitoring (e.g., measuring) the optical power of the primary ring 107A are discussed hereinafter with reference to FIGS. 6A-6C, and therefore, are not discussed here.

At block 330 of FIG. 3, the output power (e.g., heating power) of the heater 103 of the primary ring 107A of each ring modulator 120 (e.g., 120A or 120B) is adjusted (e.g., through the control of the heater control unit 101) to heat the primary ring 107A to a target temperature, such that the resonant wavelength of the primary ring 107A of each ring modulator 120 (e.g., 120A or 120B) at its respective target temperature matches the operating wavelength (e.g., $\lambda_1$ or $\lambda_2$) of the ring modulator 120. The backup ring 107A of each ring modulator 120 is heated by its corresponding heater 103 to a temperature different from the target temperature of the primary ring 107A of the ring modulator 120, such that the resonant wavelength of the backup ring 107B is tuned to a pre-determined value $\lambda_0$ that is different from $\lambda_1$ and $\lambda_2$.

In the illustrated embodiments, when the resonant wavelength of the ring 107 (e.g., 107A or 107B) matches the wavelength of a light signal traveling in the bus waveguide 102, the optical coupling between the bus waveguide 102 and the ring 107 for the light signal is maximized, and light signal is said to be coupled (e.g., optically coupled) into the ring 107. Conversely, if there is a mismatch between the resonant wavelength of the ring 107 and the wavelength of the light signal in the bus waveguide 102, there is little or no optical coupling between the bus waveguide 102 and the ring 107 for the light signal, and the light signal is said to not couple into the ring 107. Therefore, in the example of FIG. 2A, due to the processing of block 330, the light signal 131 having wavelength $\lambda_1$ is coupled into the primary ring 107A of the ring modulator 120A, and the light signal 133 having wavelength $\lambda_2$ is coupled into the primary ring 107A of the ring modulator 120B.

In some embodiments, the heater control unit 101 of each ring modulator 120 may sweep the heater power across a range such that the resonant wavelength of the primary ring 107A matches (e.g., aligns with) the operating wavelength ($\lambda_1$ or $\lambda_2$) of the ring modulator 120. For example, the optical power of the light signal 131 coupled into the primary ring 107A of the ring modulator 120A is monitored (e.g., measured) continuously while the heater power is adjusted, and the heater power setting (or the temperature of the primary ring 107A) that results in the maximum measured optical power in the primary ring 107A of the ring modulator 120A is used as the optimum setting for aligning the resonant frequency of the primary ring 107A with the operating wavelength $\lambda_1$ of the ring modulator 120A.

Figure 4:
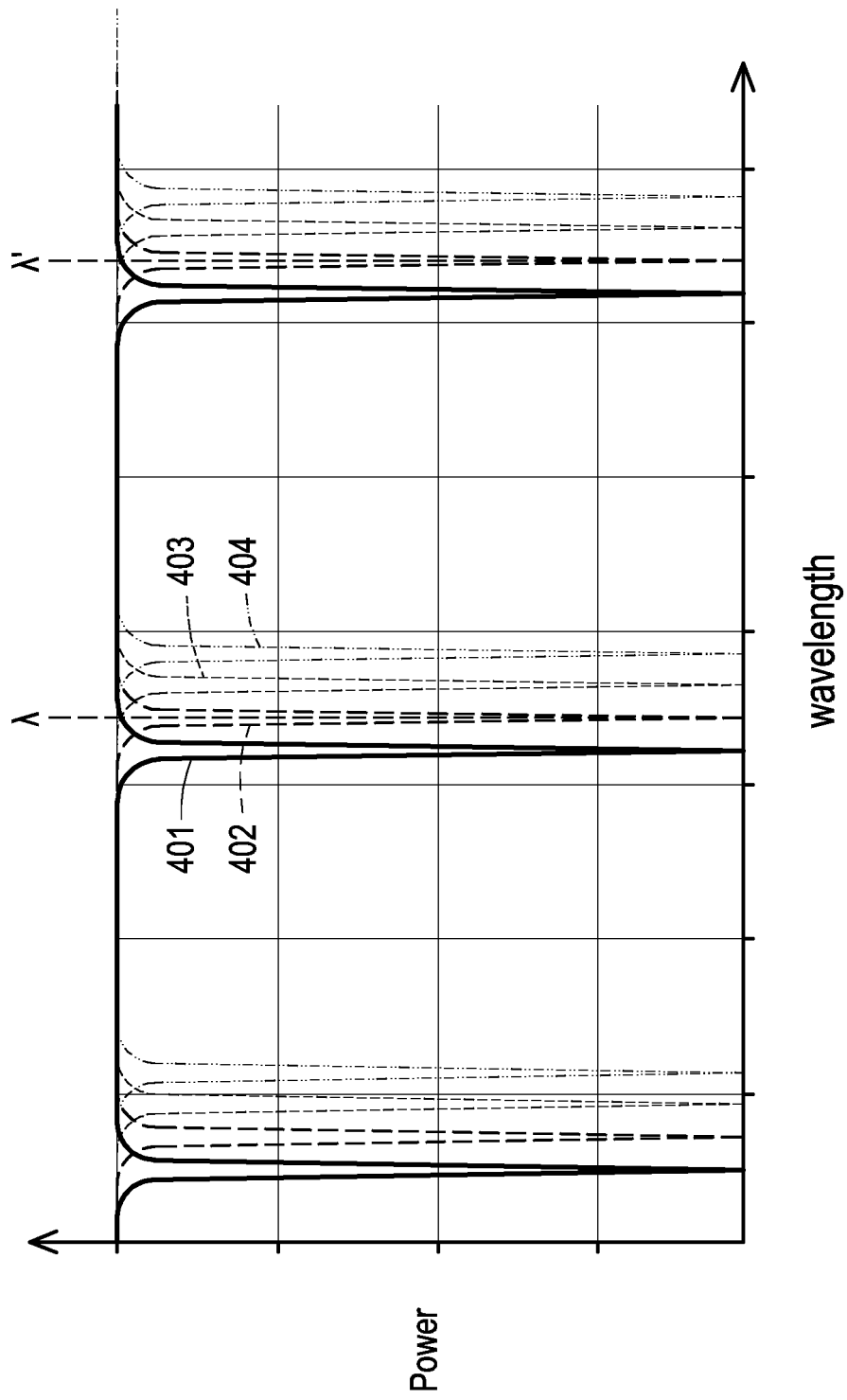
FIG. 4 illustrates the spectrum of a ring modulator at different temperatures, in an embodiment.

As discussed above, the resonant wavelength of the ring 107 (e.g., 107A or 107B) changes with the temperature of the ring 107, and therefore, may be tuned (e.g., adjusted) by adjusting the temperature of the ring 107 (e.g., through the corresponding heater 103). FIG. 4 illustrates the effect of temperature on the resonant wavelength of the ring 107.

Referring temporarily to FIG. 4, which illustrates the spectrum of a ring modulator at different temperatures, in an embodiment. FIG. 4 shows the measured optical power on the bus waveguide 102 after a wide spectrum light signal (e.g., with light components having wavelengths across a wide range, such as a white-colored light signal) injected into the bus waveguide 102 is coupled into the ring 107. Four curves 401, 402, 403, and 404 shown in FIG. 4 correspond to temperatures of the ring 107 at 10° C., 20° C., 30° C., and 40° C., respectively. As illustrated in FIG. 4, when the wavelength of a light component matches the resonant wavelength of the ring 107 at a particular temperature, that particular light component is coupled into the ring 107 and is subjected to modulation, which may reduce the power of the light component. As a result, the power of the remaining light signal on the bus waveguide 102 shows notches at the resonant wavelengths of the ring 107. FIG. 4 shows that different temperatures of the ring result in different resonant wavelengths of the ring. In addition, for a particular temperature, there are multiple resonant wavelengths, as indicated by the multiple notches of each curve in FIG. 4.

Still referring to FIG. 4, the distance between two consecutive (e.g., adjacent) notches of a particular curve (e.g., 401, 402, 403, 404) is called free spectral range (FSR). The FSR is a design parameter for the ring 107. A common range for FSR is between about 5 nm and about 30 nm. If multiple ring modulators are employed in a wavelength-division multiplexing (WDM) system with multiple operating wavelengths, the FSR tends to be designed wider. In some embodiments, the range of resonant wavelength that is adjustable (e.g., covered) by the heater 103 is designed to span at least one FSR, which provides flexibility to choose the resonant wavelength of the ring 107 and to provide enough separation between the resonant wavelengths of the primary ring 107A and the backup ring 107B.

Studies have shown that silicon has a strong thermo-optical effect, which means that its optical property can be significantly changed by changing its temperature. The resonant wavelength of a ring 107 formed of silicon may be tuned substantially linearly with respect to temperature. For example, the resonant wavelength of a silicon ring may shift by about 0.08 nm for each degree (e.g., 1° C.) of temperature change. Therefore, by changing the temperature of the ring 107 to shift its resonant wavelength, the ring 107 can be activated or de-activated, depending on whether the resonant wavelength matches the operating wavelength of the ring modulator 120.

Referring back to FIGS. 3 and 2A, at block 340, for each of ring modulator 120 (e.g., 120A or 120B), the RF circuit 115 is turned on, and the RF signal generated by the RF circuit 115 is applied (e.g., connected) to the primary ring 107A by the switch 113. In other words, the switch 113 is at the left-hand side position to connect the RF circuit 115 with the primary ring 107A. In the illustrated embodiment, the RF signal applied to the contacts 109/111 of the primary ring 107A in each ring modulator 120 (e.g., 120A or 120B) modulates the light signal (e.g., 131 or 133) coupled into the primary ring 107A. The modulation of the light signal is accomplished through physical processes such as plasma dispersion effect and free-carrier absorption, which change the refractive index and the absorption coefficient of the ring 107 to modulate the light signal. The modulated light signal 131 in the ring modulator 120A is coupled back onto the bus waveguide 102 and propagates toward a through port of the bus waveguide 102. Similarly, the modulated light signal 133 in the ring modulator 120B is coupled back onto the bus waveguide 102 and propagates toward the through port of the bus waveguide 102. The through port may be connected to one or more receivers for demodulating/decoding the modulated light signals 131/133.

Next, at block 350, each of the modulated light signals 131 and 133 is processed at the receiver end by a respective receiver, which receiver may be another silicon photonic device comprising, e.g., the detector 17 and the signal receiver 19 of FIG. 1. In some embodiments, the receiver detects, analyzes, optimizes and monitors the optical signal at the receiver-end, and provides a feedback signal (e.g., through the feedback path 21 illustrated in FIG. 1) to the ring modulators 120 to further fine tuning the ring modulators 120. For example, as discussed above with reference to FIG. 1, receiver may provide an indicator of the received signal quality, such as bit error rate (BER) measurement, a signal-to-noise ratio (SNR) measurement, or a measurement of the eye-opening in the eye-diagram of the demodulated signal at the receiver. Based on the indicator of the received signal quality, the ring modulator 120 may adjust its parameters (e.g., adjusting the resonant wavelength by adjusting the heater power) to optimize or improve the received signal quality at the receiver. In some embodiments, the feedback path from the receiver to the ring modulator 120 is omitted. In other words, the ring modulator 120 operates without feedback from the receiver side.

Next, at block 360, the status of the primary ring 107A of each ring modulator 120 is monitored to detect failure of the primary ring 107A. Any suitable method may be used to detect failure of the primary ring 107A. For example, if the measured optical power in the primary ring 107A, which has been operating properly, suddenly drops below a pre-determined threshold, this might indicate a failure of the primary ring. To confirm, the heater control unit 101 may sweep the heater power across a pre-determined range around the last known good setting (e.g., the last heater power setting for aligning the resonant wavelength with the operating wavelength) to adjust the resonant wavelength of the primary ring 107A. If the measured optical power in the primary ring 107A remains below the pre-determined threshold regardless of the heater power setting during the sweep, then it may be determined that the primary ring 107A has failed (e.g., is broken). As another example, the measured optical powers in the primary ring 107A and the backup ring 107B may be compared to detect a failure in the primary ring 107A. If the primary ring 107A is functioning properly, then the measured optical power in the primary ring 107A should be higher than the measured optical power in the backup ring 107B (e.g., higher by a pre-determined percentage or amount) during modulation. However, if the primary ring 107A fails, the measured optical power in the primary ring 107A may be substantially the same as (e.g., within a small, pre-determined range around) the measured optical power in the backup ring 107B.

If no failure of the primary ring 107A is detected, then the processing goes back to block 350. Otherwise, processing proceeds to block 370, where the backup ring 107B is activated to replace the failed primary ring 107A. In particular, at block 370, the heater control unit 101 controls the heater 103 of the primary ring 107A, such that the primary ring 107A is heated to a temperature that corresponds to a resonant wavelength of $\lambda_0$, where $\lambda_0$ is different from the operating wavelength (e.g., $\lambda_1$ or $\lambda_2$) of the ring modulator 120. This ensures that the primary ring 107A is turned off, and the light signal 131 or 133 will not be coupled into the primary ring 107A. In addition, the heater control unit 101 controls the heater 103 of the backup ring 107B, such that the backup ring 107B is heated to a temperature that corresponds to a resonant wavelength matching the operating wavelength (e.g., $\lambda_1$ or $\lambda_2$) of the ring modulator 120. In other words, the backup ring 107B is now activated such that the light signal 131 or 133 is coupled into the backup ring 107B.

Next, at block 380, the RF signal from the RF circuit 115 is re-routed from the (failed) primary ring 107A to the backup ring 107B by changing the switching position of the switch 113, e.g., from the left-hand side switching position to the right-hand side switching position of FIG. 2A. Therefore, the light signal in the backup ring 107B is now modulated by the RF signal.

Next, at block 390, each of the modulated light signals 131 and 133 is processed at the receiver end by a respective receiver. The receiver detects, analyzes, optimizes and monitors the optical signal at the receiver-end, and provides a feedback signal (e.g., through the feedback path 21 illustrated in FIG. 1) to the ring modulators 120 to further fine tuning the ring modulators 120. Processing is the same as or similar to block 350, thus details are not repeated. In some embodiments, the processing of block 390 is omitted, such that the ring modulator 120 operates without feedback from the receiver side.

Note that the method 300, which replaces the failed primary ring 107A with the backup ring 107B, may be used during product testing. For example, after the silicon photonic device 100 is fabricated in a manufacturing facility, testing of the fabricated silicon photonic device 100 may be conducted, e.g., by feeding light signals into the ring modulators 120, modulating the light signal using the ring modulator 120 with an RF signal, and demodulating/decoding the output of the ring modulator 120. If during product testing, one of the primary ring 107A is found to be broken, then the backup ring 107B is activated to replace the primary ring 107A, and the silicon photonic device 100 is still functional and can still be used. This increases the production yields. As another example, after the silicon photonic device 100 has been deployed in the field, if the primary ring 107A fails, the corresponding backup ring 107B can be activated to replace the failed primary ring 107A without the need to replace the silicon photonic device. This reduces the product failure rate and saves the cost to replace the silicon photonic chip.

Figure 5A:
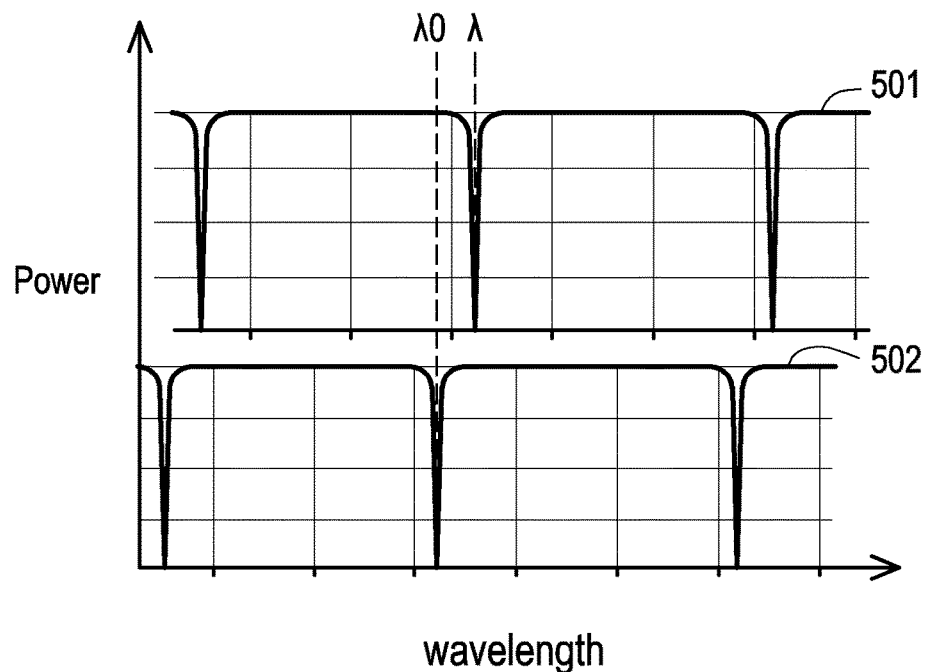
FIGS. 5A and 5B illustrate adjustment of the resonance wavelengths of the rings in a ring modulator, in an embodiment.
Figure 5B:
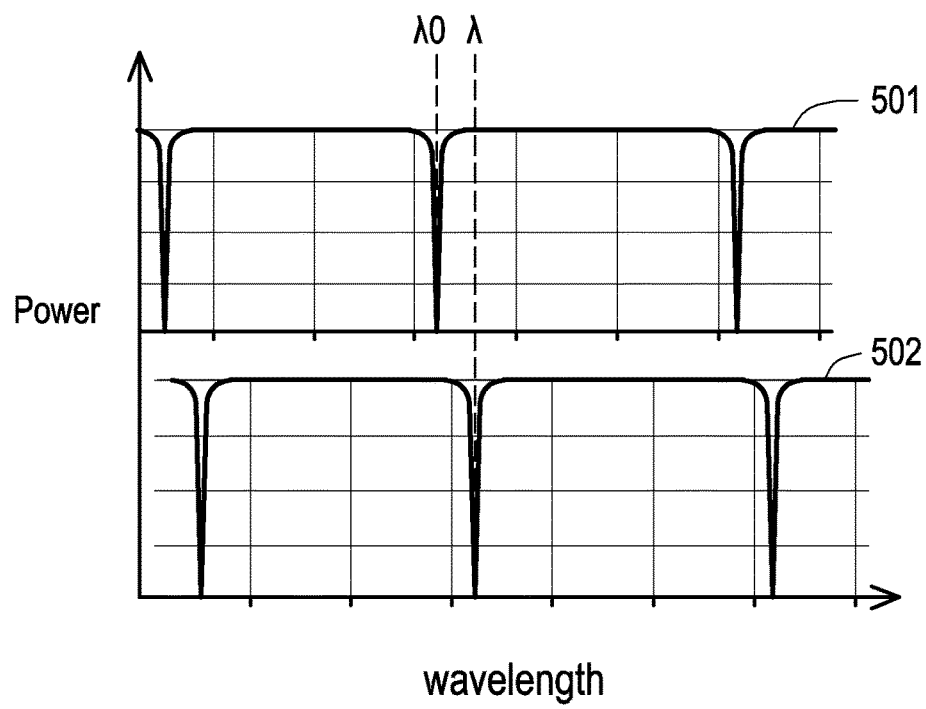

FIGS. 5A and 5B illustrate adjustment of the resonance wavelengths of the rings in a ring modulator, in an embodiment. In FIG. 5A, two curves 501 and 502 are plotted in two separate subplots, where the x-axes of the two subplots are aligned, and where the curves 501 and 502 show the spectrums of the primary ring 107A and the backup ring 107B, respectively. Similar to FIG. 4, the notches in the curves 501 and 502 correspond to the resonant wavelengths of the respective ring. FIG. 5A illustrates locations of the resonant wavelengths of the primary ring 107A and the backup ring 107B, when the primary ring 107A is functioning properly. As discussed above with reference to FIG. 3, the resonant wavelength of the primary ring 107A is tuned to be the operating wavelength A of the ring modulator 120, which operating wavelength λ may be $\lambda_1$ or $\lambda_2$ for the example of FIG. 2A, and the resonant wavelength of the backup ring 107B is tuned to be $\lambda_0$, so that the light signal in the bus waveguide 102 is not coupled into the backup ring 107B.

FIG. 5B is similar to FIG. 5A, but corresponds to the condition where the primary ring 107A fails. As discussed above with reference to FIG. 3, when the primary ring 107A fails, the resonant wavelength of the primary ring 107A is tuned to be $\lambda_0$, so that the light signal in the bus waveguide 102 is not coupled into the primary ring 107A, and the resonant wavelength of the backup ring 107B is tuned to be the operating wavelength A of the ring modulator, so that the backup ring 107B replaces the functionalities of the primary ring 107A.

Figure 6A:
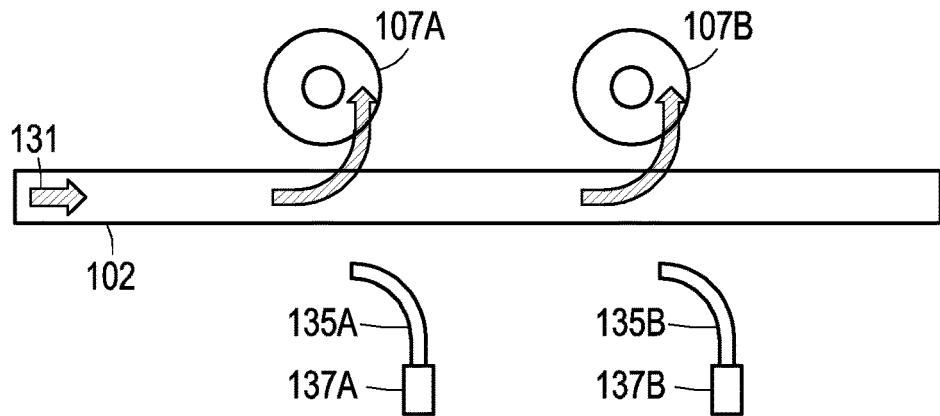
FIGS. 6A, 6B, and 6C illustrate various power monitors for silicon photonic devices, in some embodiments.
Figure 6B:
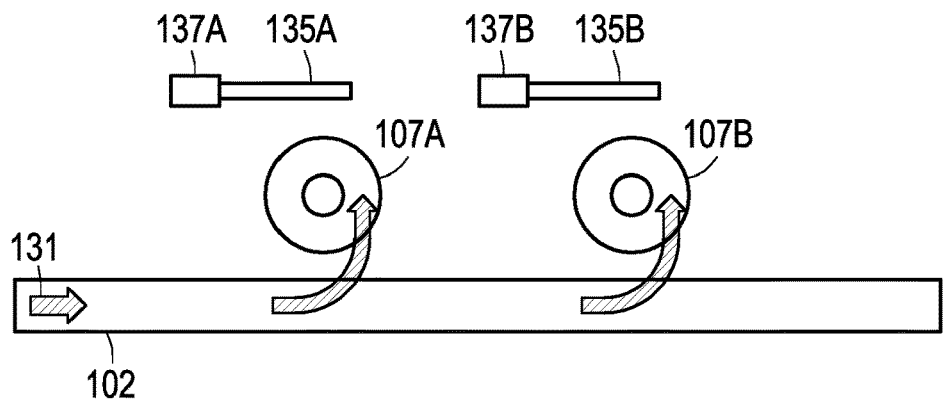
Figure 6C:
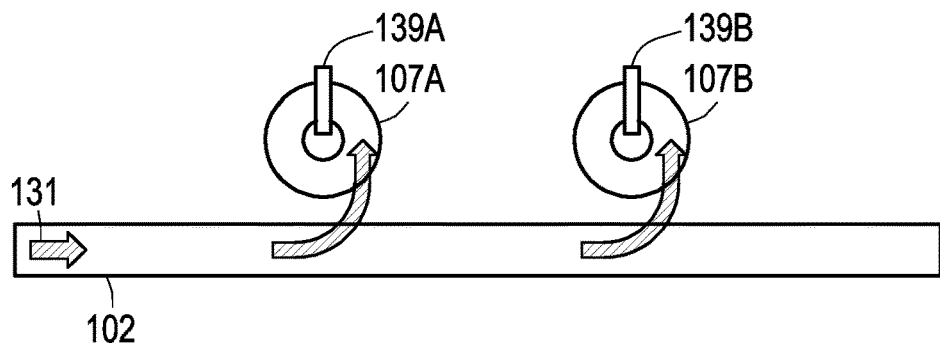

FIGS. 6A, 6B, and 6C illustrate various power monitors for silicon photonic devices, in some embodiments. For simplicity, in FIGS. 6A, 6B, and 6C, only the rings 107A and 107B of the ring modulator 120A of FIG. 2A and the corresponding optical monitors are shown. The same or similar optical monitors may be formed for the rings 107A and 107B of other ring modulators 120 in the silicon photonic device.

Referring to FIG. 6A, two power monitors 137A and 137B are connected to optical power taps 135A and 135B, respectively. The optical power tap 135A is optically coupled to the bus waveguide 102 at a location between the rings 107A and 107B. The optical power tap 135B is optically coupled to the bus waveguide 102 at a location after where the light signal 131 couples into the ring 107B. Therefore, the power monitor 137A measures the optical power in the bus waveguide 102 at the location between the rings 107A and 107B, and the power monitor 137B measures the optical power in the bus waveguide 102 at the location after the ring 107B. An optical power monitor may be designed to detect the optical power for a single wavelength, or the optical power in a frequency band. The optical power taps 135A/135B and the power monitors 137A/137B may be any suitable device known and used in the art, details are not discussed here.

For the setup of FIG. 6A, the measured optical power during modulation decreases if the corresponding ring 107 (e.g., 107A or 107B) is activated (e.g., resonant wavelength matching the operating wavelength), because the light signal is coupled into the ring 107 for modulation, which may reduce the optical power on the bus waveguide 102. By monitoring the values of the measured optical power (e.g., monitored by the heater control unit 101), it is possible to determine whether a particular ring 107 is activated, de-activated, or broken. For example, if after the ring 107A is heated to a target temperature (which aligns the resonant wavelength of the ring 107A to the operating wavelength), the optical power measured by the power monitor 137A drops by a pre-determined percentage, then it may be determined that the ring 107A is activated. If the ring 107A, which has been activated, is heated to a different temperature, and the optical power measured by the power monitor 137A increases by a pre-determined percentage, then it may be determined that the ring 107A is now deactivated. As another example, if the optical power measured by the power monitor 137A remains high (e.g., above a pre-determined threshold) regardless of the temperature of the ring 107A during a temperature sweep, then the ring 107A may be determined to be broken.

Referring to FIG. 6B, two power monitors 137A and 137B are connected to optical power taps 135A and 135B, respectively. The optical power tap 135A is optically coupled to the ring 107A, and the optical power tap 135B is optically coupled to the ring 107B. Since the power monitors 137A and 137B of FIG. 6B measure the optical power inside the rings 107A and 107B, respectively, the measured optical power increases if the ring 107 is activated (e.g., resonant wavelength matching the operating wavelength), and decrease if the ring 107 is de-activated or broken. Therefore, by monitoring the values of the measured optical power, it is possible to determine whether a particular ring 107 is activated, de-activated, or broken. For example, if after the ring 107A is heated to a target temperature which aligns the resonant wavelength of the ring 107A to the operating wavelength, the optical power measured by the power monitor 137A increases by a pre-determined percentage, then it may be determined that the ring 107A is activated. If the ring 107A, which has been activated, is heated to a different temperature, and the optical power measured by the power monitor 137A decrease by a pre-determined percentage, then it may be determined that the ring 107A is now deactivated. As another example, if the optical power measured by the power monitor 137A remains low (e.g., below a pre-determined threshold) regardless of the temperature of the ring 107A during a temperature sweep, then the ring 107A may be determined to be broken.

Referring to FIG. 6C, photo current monitors 139A and 139B are optically coupled to the rings 107A and 107B, respectively, and measure the optical power in the respective ring 107. The light signal 131, if coupled into the ring 107, causes an optical current in the photo current monitor 139 (e.g., 139A or 139B) coupled to the ring. Therefore, by monitoring the current flowing through the photo current monitor 139A and 139A, it is possible to determine whether a particular ring 107 is activated, deactivated, or broken. For example, methods same as or similar to those discussed above with reference to FIG. 6B may be used.

Figure 7B:
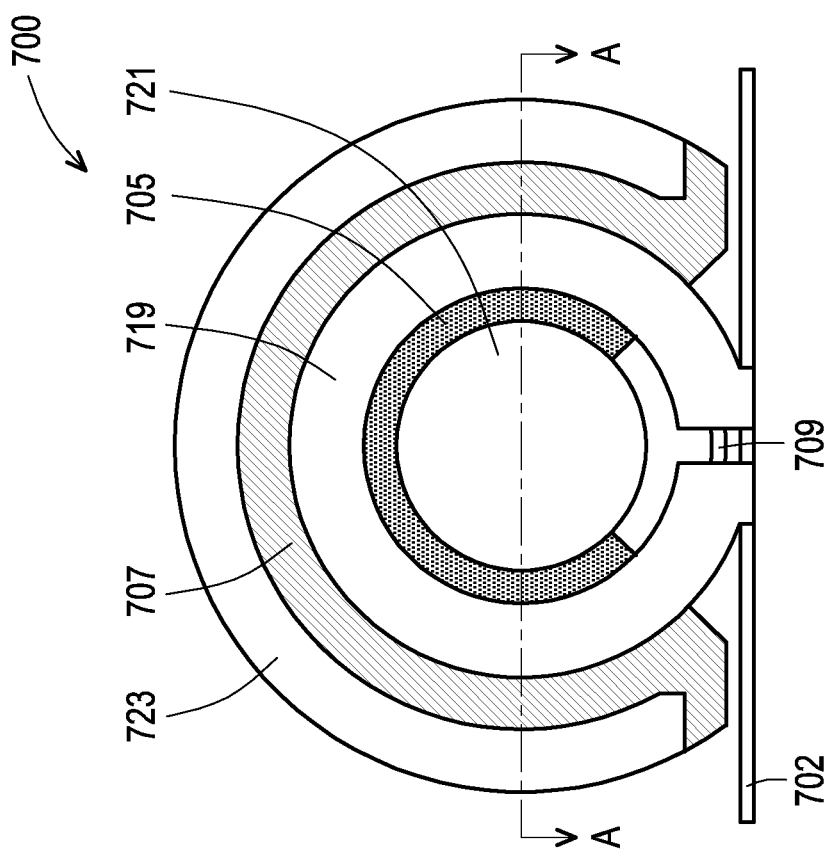
FIGS. 7A, 7B, and 7C illustrate various views of a ring modulator, in an embodiment.
Figure 7A:
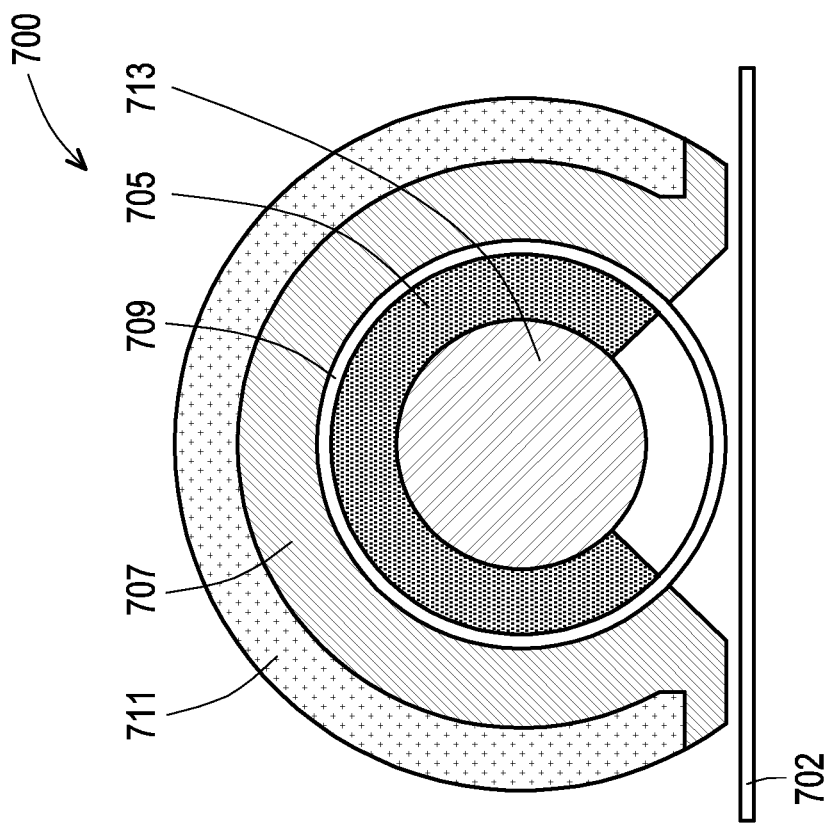
Figure 7C:
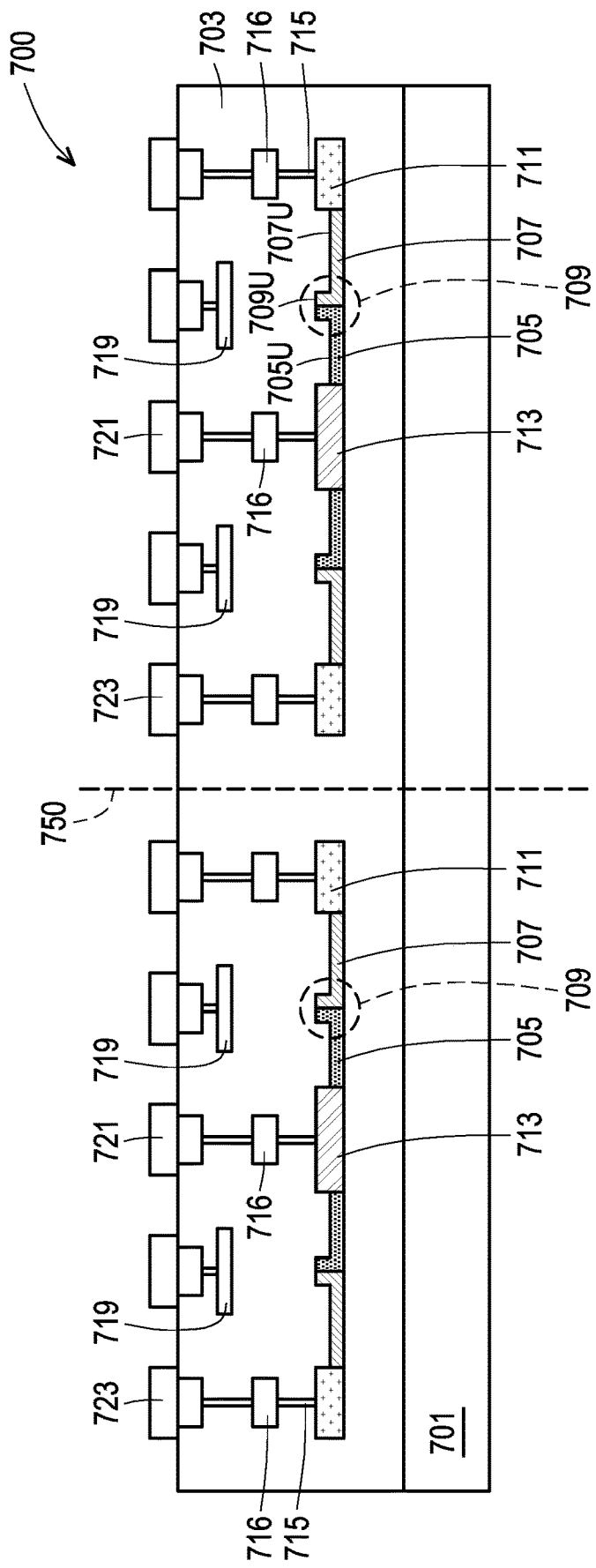

FIGS. 7A, 7B, and 7C illustrate various views (e.g., plan view, crosssectional view) of a ring modulator 700, in an embodiment. The ring modulator 700 of FIGS. 7A, 7B, and 7C may be used as the ring modulator 120 in the various disclosed embodiments herein. Note that for simplicity, not all features of the ring modulator 700 are shown. In addition, FIGS. 7A, 7B, and 7C may show only a portion of the ring modulator 700.

FIG. 7A illustrates a plan view the ring modulator 700. For simplicity, FIG. 7A shows portions of the ring modulator 700 that correspond to one of the ring 107 in FIG. 2A. FIG. 7B illustrates the same plan view as FIG. 7A, but with additional elements (e.g., heating element, electrical contacts) of the ring modulator 700 shown. FIG. 7C illustrates the cross-sectional view of the ring modulator 700 along cross-section A-A in FIG. 7B. Note that in FIG. 7C, two identical structures on opposing sides of a dashed line 750 are illustrated, wherein each of the identical structures corresponds to (portions of) one of the rings 107 and its corresponding heating element 105 in FIG. 2A.

As illustrated in FIG. 7A, the ring modulator 700 includes a bus waveguide 702, a first doped region 705, a second doped region 707, a ring 709, a first contact region 713, and a second contact region 711. The bus waveguide 702 may be formed of a semiconductor material, such as silicon, and corresponds to the bus waveguide 102 of FIG. 2A. The first doped region 705 and the second doped region 707 are two annular shaped regions (or portions of annual shaped regions) that are formed of a suitable semiconductor material (e.g., silicon) and are doped with opposite types (e.g., N-type or P-type) of dopants. For example, the first doped region 705 may be an N-doped region (e.g., a silicon region doped with an N-type dopant), and the second doped region 707 may be a P-doped region (e.g., a silicon region doped with a P-type dopant); or vice versa. The ring 709 is an interface region between the first doped region 705 and the second doped region 707, which interface region forms a ring-shaped waveguide. The ring 709 corresponds to the ring 107 of FIG. 2A.

FIG. 7A further shows the first contact region 713 surrounded by and contacting the first doped region 705. In addition, FIG. 7A shows the second contact region 711 surrounding and contacting the second doped region 707. The first contact region 713 is a heavily doped semiconductor region having the same dopant type as the first doped region 705, and the second contact region 711 is a heavily doped semiconductor region having the same dopant type as the second doped region 707. In an example embodiment where the first doped region 705 is an N-doped region and the second doped region 707 is a P-doped region, the first contact region 713 and the second contact region 711 are N++ regions and P++ region, respectively.

FIG. 7B shows additional layers of the ring modulator 700. In particular, FIG. 7B shows the heating element 719 (a metal pattern), which corresponds to the heating element 105 of FIG. 2A. Additionally, FIG. 7B illustrates metal contacts 721 and 723, which are electrically coupled to the underlying first contact region 713 and the second contact region 711, respectively. The metal contacts 721 and 723 correspond to the contacts in and 109 of FIG. 2A.

FIG. 7C shows the substrate 701 of the ring modulator 700. The substrate 701 may be a semiconductor substrate, such as silicon, doped or undoped, or an active layer of a semiconductor-on-insulator (SOI) substrate. The semiconductor substrate may include other semiconductor materials, such as germanium; a compound semiconductor including silicon carbide, gallium arsenic, gallium phosphide, gallium nitride, indium phosphide, indium arsenide, and/or indium antimonide; an alloy semiconductor including SiGe, GaAsP, AlInAs, AlGaAs, GaInAs, GaInP, and/or GaInAsP; or combinations thereof. Other substrates, such as multi-layered or gradient substrates, may also be used.

As illustrated in FIG. 7C, a plurality of dielectric layers 703 are formed over the substrate 701. The dielectric layers 703 may be made of one or more suitable dielectric materials such as silicon oxide, silicon nitride, low-k dielectrics such as carbon doped oxides, extremely low-k dielectrics such as porous carbon doped silicon dioxide, combinations of these, or the like. The dielectric layers 703 may be formed through a process such as chemical vapor deposition (CVD), although any suitable process may be utilized.

In the example of FIG. 7C, each of the first doped region 705, the second doped region 707, the first contact region 713, and the second contact region 711 is a silicon region doped with an N-type or a P-type dopant. The silicon region may be formed by forming a silicon layer (e.g., Si) over the underlying dielectric layer 703, doping the silicon layer with an N-type or P-type dopant, and patterning the silicon layer to form the designed shape for the respective region. In FIG. 7C, the first doped region 705, the second doped region 707, the first contact region 713, and the second contact region 711 are formed at a same vertical level (e.g., same vertical distance from the substrate 701), such as over the upper surface of a same dielectric layer 703.

In FIG. 7C, the first doped region 705 and the second doped region 707 have L-shaped cross-sections. For example, the first doped region 705 and the second doped region 707 are thicker in the interface region (e.g., 709) and are thinner in other regions. In other words, an upper surface 709U of the interface region is higher (e.g., further from the substrate 701) than the upper surface 705U of portions of the first doped region 705 away from the interface region, and is higher than the upper surface 707U of portions of the second doped region 707 away from the interface region. As discussed above, the interface region 709 (e.g., regions in the dashed circle) between the first doped region 705 and the second doped region 707 form a waveguide, and is referred to as the ring 709 (e.g., a silicon ring) of the ring modulator 700.

FIG. 7C further illustrates conductive structures formed in the dielectric layer 703, such as vias 715 and conductive lines 716, that are electrically coupled to the first contact region 713 and the second contact region 711. The conductive features also include heating elements 719 (e.g., a resistor), which correspond to the heating element 105 of FIG. 2A. In FIG. 7C, the heating elements 719 are formed in a metallization layer disposed over the ring 709.

In FIG. 7C, metal contacts 721 and 723, also referred to as contact pads, are formed over an uppermost dielectric layer 703 for electrical connection to other devices. The vias 715, conductive lines 716, the heating elements 719, and the metal contacts 712/723 may be formed of one or more suitable metal materials, such as copper, cobalt, tungsten, the like, or combinations thereof, and may be formed using any suitable method. Although not illustrated, electrical devices, such as transistors, diodes, capacitors, resistors, etc., may be formed in and/or on the substrate 701 and may be interconnected by interconnect structures formed by, e.g., metallization patterns in the dielectric layers 703 to form functional circuits. The functional circuits may be or include, e.g., the RF circuits 115, the heater control unit 101, and/or the switch 113 of FIG. 2A that are electrically coupled to the ring modulator 700.

The ring modulator disclosed herein can be implemented in semiconductor devices with a very small footprint. For example, the size (e.g., area) of the resonant structure (e.g., each ring and its corresponding heater and switch) may be about 100 um$^2$. For comparison purpose, the size of a typical electrical contact pad is about 2500 um$^2$. Due to the compact size of the resonant structure, the impact on the overall size and cost of the silicon photonic device by having the redundant resonant structure in the ring modulator is small. In addition, by using the compact and power efficiency resonant structure, power consumption is not significantly increased by adding the redundant resonant structures. In some embodiments, more than one backup rings may be added to each ring modulator without significantly increasing the chip size and power consumption.

Figure 8:
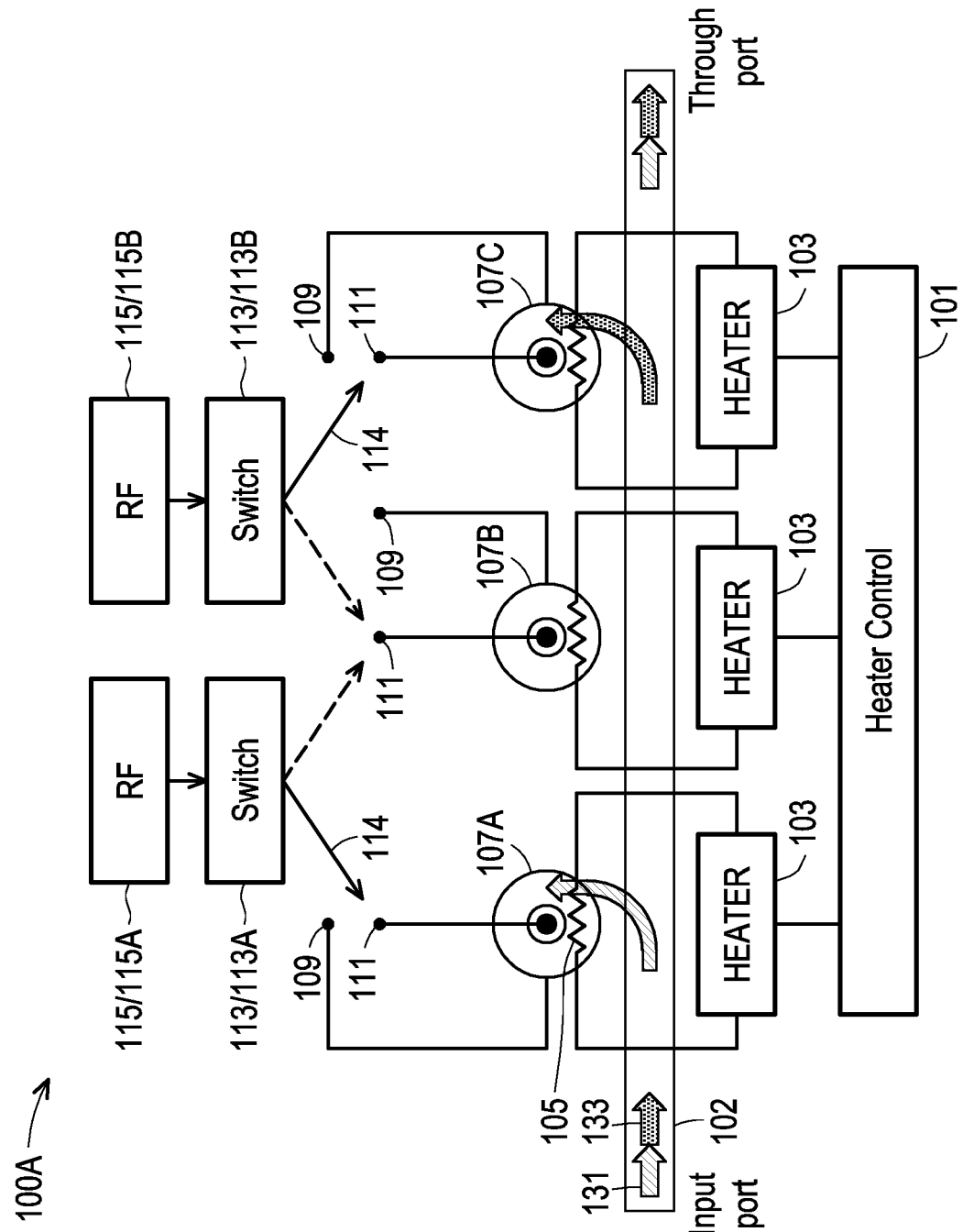
FIG. 8 illustrates a block diagram of a silicon photonic device, in another embodiment.

FIG. 8 illustrates a block diagram of a silicon photonic device 100A, in another embodiment. The silicon photonic device 100A is similar to the silicon photonic device 100 of FIG. 2A, but the ring 107B serves as the backup ring for both the ring 107A and 107C. In other words, unlike FIG. 2A where each ring modulator 120 has two rings 107, the silicon photonic device 100A of FIG. 8 uses three rings 107 (e.g. 107A, 107B, and 107C) to implement two ring modulators, where the ring 107B is shared by the ring 107A and 107C as the shared backup ring. One skilled in the art will readily appreciate that if ring 107A fails, the switch 113A switches to the right-hand side switching position to couple the RF circuit 115A to the ring 107B, and the ring 107B is heated to tune its resonant wavelength to align with that of the light signal 131. Similarly, if ring 107C fails, the switch 113B switches to the left-hand side switching position to couple the RF circuit 115B to the ring 107B, and the ring 107B is heated to tune its resonant wavelength to align with that of the light signal 133. Due to less resonant structures (e.g., rings 107 and its corresponding heater 103) in the design of FIG. 8, the design of FIG. 8 is more area and energy efficient than that of FIG. 2A.

Figure 9:
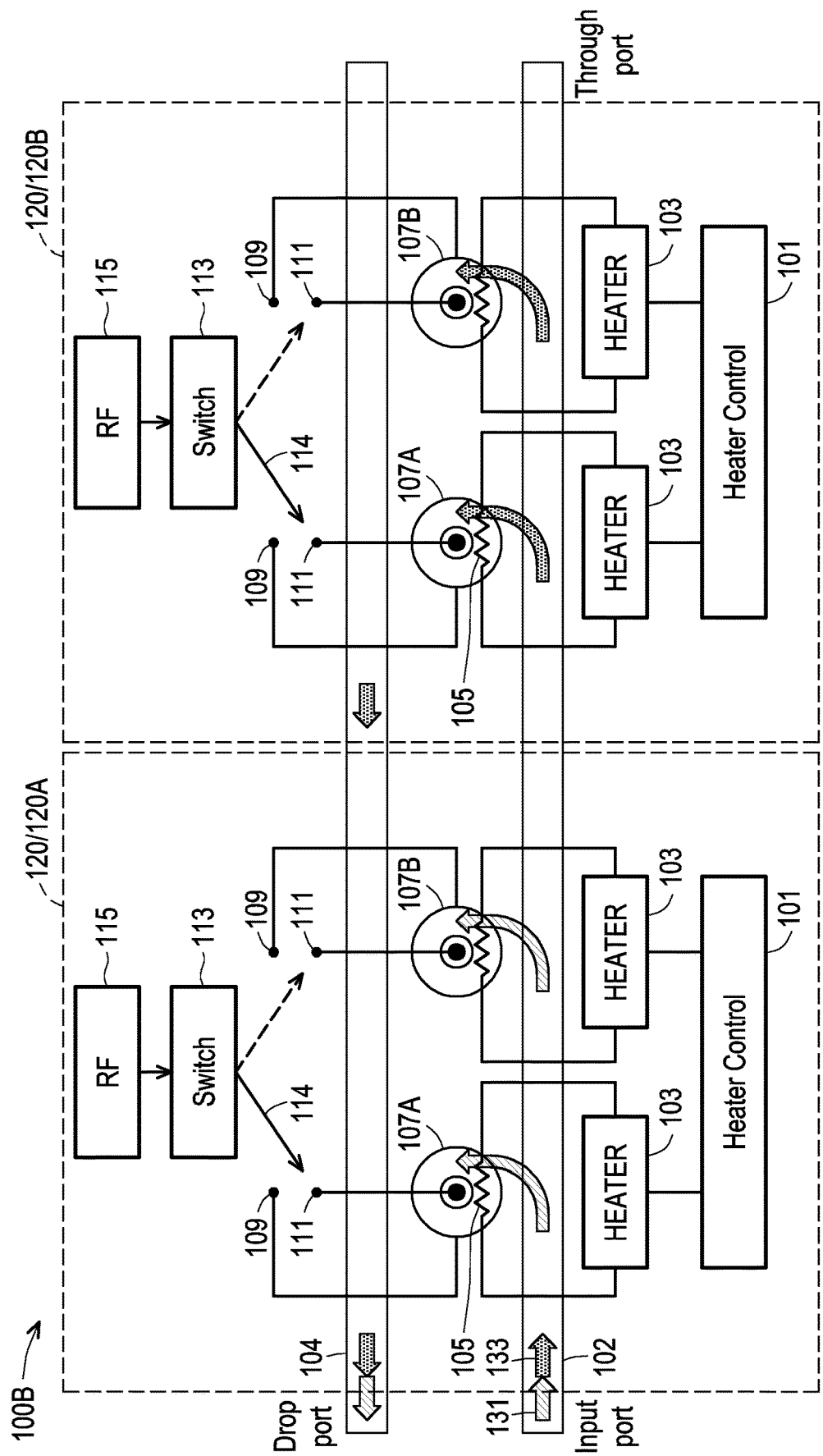
FIG. 9 illustrates a block diagram of a silicon photonic device, in another embodiment.

FIG. 9 illustrates a block diagram of a silicon photonic device 100B, in another embodiment. The silicon photonic device 100B is similar to the silicon photonic device 100 of FIG. 2A, but with a second bus waveguide 104 coupled to the rings 107. The light signals 131 and 133, after being modulated by the ring modulators 120, are optically coupled to the second bus waveguide 104 and outputted at a drop port of the second bus waveguide 104.

Figure 10:
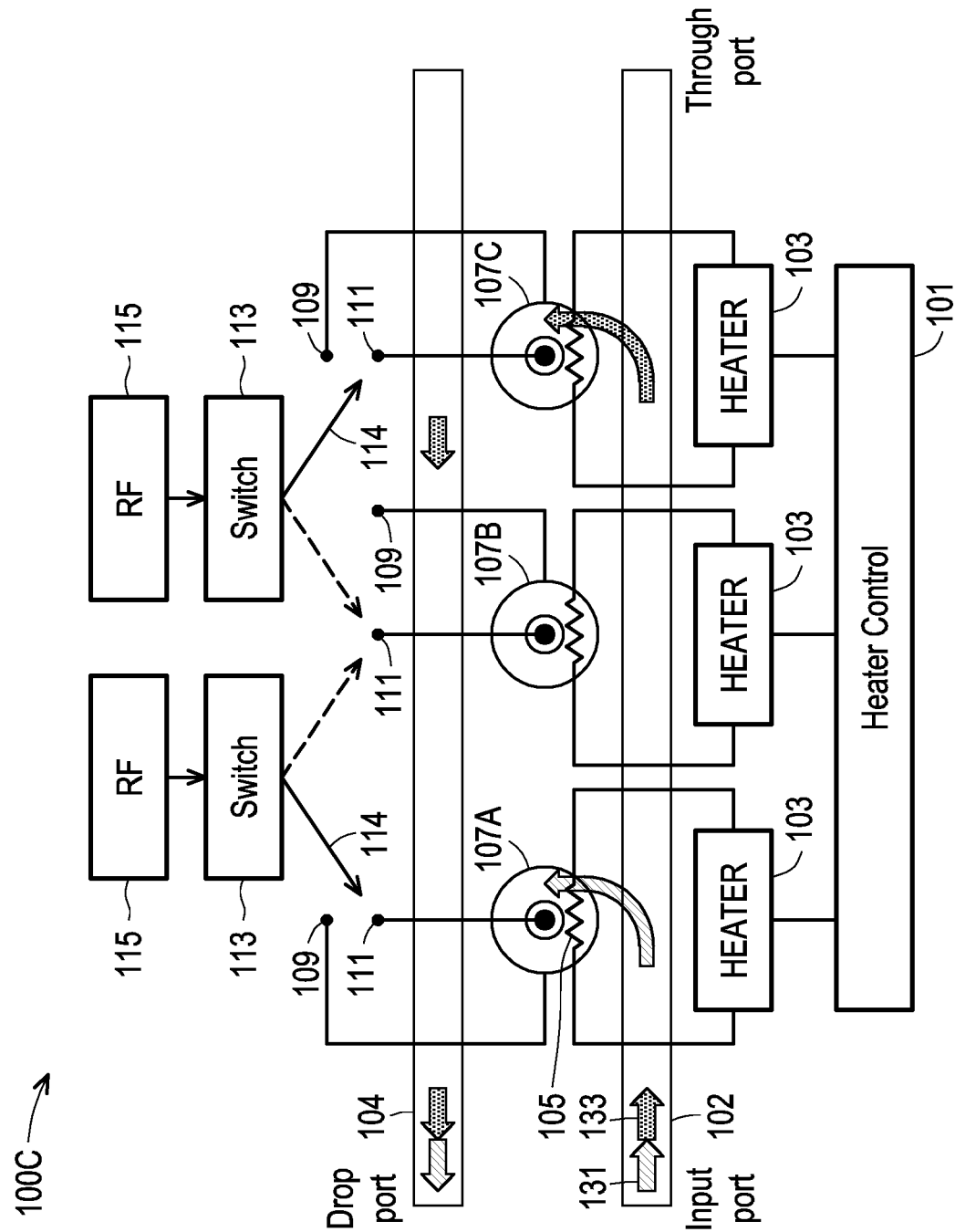
FIG. 10 illustrates a block diagram of a silicon photonic device, in another embodiment.

FIG. 10 illustrates a block diagram of a silicon photonic device 100C, in another embodiment. The silicon photonic device 100C is similar to the silicon photonic device 100A of FIG. 8, but with a second bus waveguide 104 coupled to the rings 107. The light signals 131 and 133, after being modulated by the ring modulators 120, are optically coupled to the second bus waveguide 104 and outputted at a drop port of the second bus waveguide 104.

Figure 11:
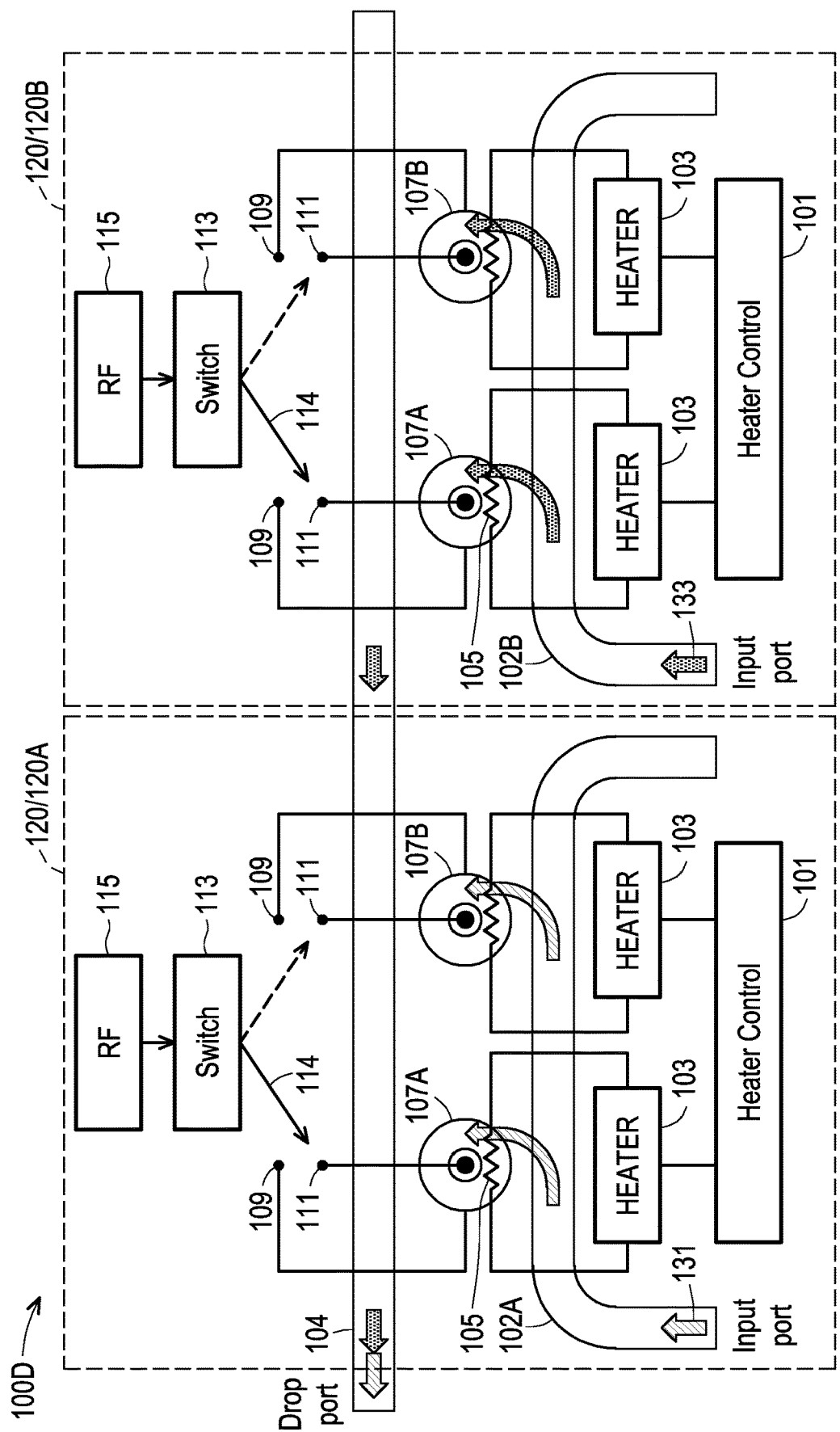
FIG. 11 illustrates a block diagram of a silicon photonic device, in yet another embodiment.

FIG. 11 illustrates a block diagram of a silicon photonic device 100D, in yet another embodiment. The silicon photonic device 100D is similar to the silicon photonic device 100B of FIG. 9, but with separate input bus waveguides 102A and 102B for the ring modulators 120A and 120B, respectively. In particular, the light signal 131 is injected into the bus waveguide 102A, and the light signal 133 is injected into the bus waveguide 102B. The light signals 131 and 133, after being modulated by the ring modulators 120A and 102B, respectively, are optically coupled to the second bus waveguide 104 and outputted at a drop port of the second bus waveguide 104. Note that the silicon photonic device 100D not only functions as optical modulators, but also functions as an optical multiplexer. As illustrated in FIG. 11, the light signals 131 and 133, which are originally transmitted in separate bus waveguides 102A and 102B, are combined into the second bus waveguide 104 after being modulated. Therefore, the silicon photonic device 100D may be used to combine light signals at different wavelengths.

Figure 12:
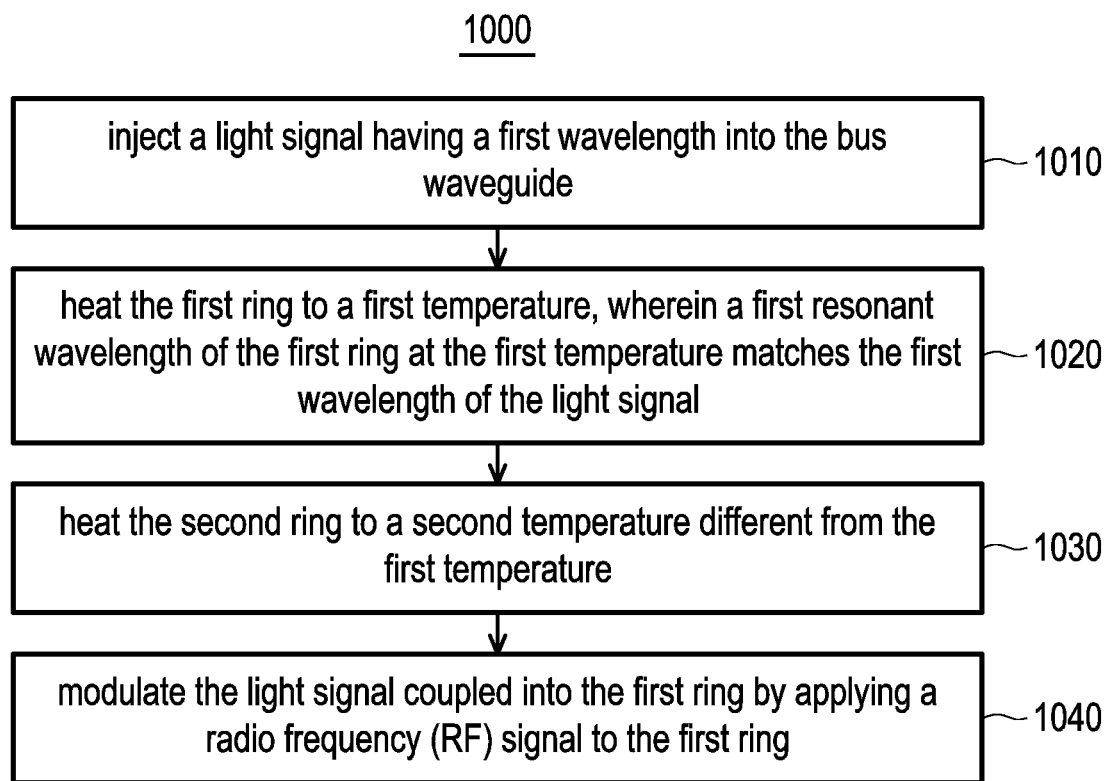
FIG. 12 illustrates a flow chart of a method of operating a ring modulator, in accordance with some embodiments.

FIG. 12 illustrates a flow chart of a method 1000 of operating a ring modulator that has a first ring, a second ring, and a bus waveguide optically coupled to the first ring and the second ring. It should be understood that the embodiment method shown in FIG. 12 is merely an example of many possible embodiment methods. One of ordinary skill in the art would recognize many variations, alternatives, and modifications. For example, various steps as illustrated in FIG. 12 may be added, removed, replaced, rearranged, or repeated.

Referring to FIG. 12, at block 1010, a light signal having a first wavelength is injected into the bus waveguide. At block 1020, the first ring is heated to a first temperature, wherein a first resonant wavelength of the first ring at the first temperature matches the first wavelength of the light signal. At block 1030, the second ring is heated to a second temperature different from the first temperature. At block 1040, the light signal coupled into the first ring is modulated by applying a radio frequency (RF) signal to the first ring.

Embodiments of the present disclosure achieve some advantageous features. For example, by having the backup ring in the ring modulator 120, the redundancy provided by the backup ring improves production yield during device fabrication. After the product is deployed in the field, the ability to replace a broken ring with the backup ring reduces product failure rate, and save the cost to replace the silicon photonic device. The backup ring also allows flexibility in adding or removing optical components in the optical communication link. The disclosed embodiments can be easily integrated in semiconductor devices using existing semiconductor manufacturing process. Additional advantages include small area and lower power consumption.

In accordance with an embodiment of the present disclosure, a semiconductor device includes a first silicon ring modulator, wherein the first silicon ring modulator comprises: a first bus waveguide; a first silicon ring optically coupled to the first bus waveguide; a second silicon ring optically coupled to the first bus waveguide; a first heater configured to heat the first silicon ring; a second heater configured to heat the second silicon ring; and a first switch having a first switching position and a second switching position, wherein the first switch is configured to: at the first switching position, electrically couple the first silicon ring to a first radio frequency (RF) circuit; and at the second switching position, electrically couple the second silicon ring to the first RF circuit. In an embodiment, the semiconductor device further includes a first heater control circuit, wherein the first heater control circuit is configured to control the first heater and the second heater such that during operation of the first silicon ring modulator, the first silicon ring and the second silicon ring are heated to a first temperature and a second temperature, respectively, wherein the first temperature is different from the second temperature. In an embodiment, a first resonant wavelength of the first silicon ring is determined by the first temperature, and a second resonant wavelength of the second silicon ring is determined by the second temperature. In an embodiment, during the operation of the first silicon ring modulator, the first resonant wavelength of the first silicon ring at the first temperature matches an operating wavelength of the first silicon ring modulator. In an embodiment, during the operation of the first silicon ring modulator, a second resonant wavelength of the second silicon ring at the second temperature is different from the operating wavelength of the first silicon ring modulator. In an embodiment, during the operation of the first silicon ring modulator, the first switch is configured to be at the first switching position when a first resonant wavelength of the first silicon ring at the first temperature matches an operating wavelength of the first silicon ring modulator, or at the second switching position when a second resonant wavelength of the second silicon ring at the second temperature matches the operating wavelength of the first silicon ring modulator. In an embodiment, the semiconductor device further includes the first RF circuit. In an embodiment, the semiconductor device further includes: a first optical power monitor configured to measure an optical power in the first silicon ring; and a second optical power monitor configured to measure an optical power in the second silicon ring. In an embodiment, the semiconductor device further includes a second bus waveguide optically coupled to the first silicon ring and the second silicon ring. In an embodiment, during operation of the first silicon ring modulator, the first bus waveguide is configured to receive an input light signal, and the second bus waveguide is configured to output a modulated light signal, wherein the modulated light signal is the input light signal modulated by an RF signal from the first RF circuit. In an embodiment, the semiconductor device further includes: a second silicon ring modulator, wherein the second silicon ring modulator comprises: the first bus waveguide; a third silicon ring optically coupled to the first bus waveguide; a fourth silicon ring optically coupled to the first bus waveguide; a third heater configured to heat the third silicon ring; a fourth heater configured to heat the fourth silicon ring; a second switch having a third switching position and a fourth switching position, wherein the second switch is configured to: at the third switching position, electrically couple the third silicon ring to a second RF circuit; and at the fourth switching position, electrically couple the fourth silicon ring to the second RF circuit; and a second heater control circuit configured to control the third heater and the fourth heater such that during operation of the second silicon ring modulator, the third silicon ring and the fourth silicon ring are heated to a third temperature and a fourth temperature, respectively, wherein the third temperature is different from the fourth temperature. In an embodiment, the first heater control circuit and the second heater control circuit are configured to set the first temperature and the third temperature such that a first resonant wavelength of the first silicon ring at the first temperature matches a first operating wavelength of the first silicon ring modulator, and a second resonant wavelength of the third silicon ring at the third temperature matches a second operating wavelength of the second silicon ring modulator. In an embodiment, the semiconductor device further includes: a second silicon ring modulator, wherein the second silicon ring modulator comprises: the first bus waveguide; a third silicon ring optically coupled to the first bus waveguide; a third heater configured to heat the third silicon ring; and a second switch having a third switching position and a fourth switching position, wherein the second switch is configured to: at the third switching position, electrically couple the third silicon ring to a second RF circuit; and at the fourth switching position, electrically couple the second silicon ring to the second RF circuit.

In accordance with an embodiment of the present disclosure, a semiconductor device includes: a first bus waveguide; a first silicon ring optically coupled to the first bus waveguide; a backup silicon ring optically coupled to the first bus waveguide; a first heater and a second heater configured to heat the first silicon ring and the backup silicon ring, respectively; and a first switch, wherein the first switch is configured to electrically couple the first silicon ring to a first radio frequency (RF) circuit when the first switch is at a first switching position, and is configured to electrically couple the backup silicon ring to the first RF circuit when the first switch is at a second switching position. In an embodiment, the semiconductor device further includes a heater control circuit, wherein the heater control circuit is configured to, during operation of the semiconductor device: heat the first silicon ring to a first temperature using the first heater; and heat the backup silicon ring to a second temperature different from the first temperature using the second heater. In an embodiment, a first resonant wavelength of the first silicon ring at the first temperature matches an operating wavelength of the semiconductor device, wherein a second resonant wavelength of the backup silicon ring at the second temperature differs from the operating wavelength. In an embodiment, the heater control circuit is further configured to: in response to detecting that the first silicon ring has failed, heat the first silicon ring to the second temperature using the first heater and heat the backup silicon ring to the first temperature using the second heater.

In accordance with an embodiment of the present disclosure, a method of operating a silicon ring modulator having a first ring, a second ring, and a bus waveguide optically coupled to the first ring and the second ring includes: injecting a light signal having a first wavelength into the bus waveguide; heating the first ring to a first temperature, wherein a first resonant wavelength of the first ring at the first temperature matches the first wavelength of the light signal; heating the second ring to a second temperature different from the first temperature; and modulating the light signal coupled into the first ring by applying a radio frequency (RF) signal to the first ring. In an embodiment, the method further includes: monitoring a first optical power in the first ring; monitoring a second optical power in the second ring; and detecting malfunction of the first ring. In an embodiment, the method further includes, in response to detection of the malfunction of the first ring: heating the first ring to the second temperature; heating the second ring to the first temperature; and modulating the light signal coupled into the second ring by applying the RF signal to the second ring.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor device comprising:
   a first silicon ring modulator, wherein the first silicon ring modulator comprises:
      a first bus waveguide;
      a first silicon ring optically coupled to the first bus waveguide;
      a second silicon ring optically coupled to the first bus waveguide, wherein the first silicon ring and the second silicon ring have a same resonant wavelength at a same temperature;
      a first heater configured to heat the first silicon ring;
      a second heater configured to heat the second silicon ring;
      a first switch having a first switching position and a second switching position, wherein the first switch is configured to:
         at the first switching position, electrically couple the first silicon ring to a first radio frequency (RF) circuit; and
         at the second switching position, electrically couple the second silicon ring to the first RF circuit; and
      a first heater control circuit configured to control the first heater and the second heater such that during operation of the first silicon ring modulator, the first silicon ring and the second silicon ring are heated to different temperatures, wherein the first heater control circuit is configured to:
         heat the first silicon ring and the second silicon ring to a first temperature and a second temperature, respectively, when the first switch is at the first switching position; and
         heat the first silicon ring and the second silicon ring to the second temperature and the first temperature, respectively, when the first switch is at the second switching position.

2. The semiconductor device of claim 1, wherein a first resonant wavelength of the first silicon ring at the first temperature matches an operating wavelength of the first silicon ring modulator, wherein a second resonant wavelength of the second silicon ring at the second temperature is different from the operating wavelength of the first silicon ring modulator.

3. The semiconductor device of claim 2, wherein a third resonant wavelength of the first silicon ring at the second temperature is different from the operating wavelength of the first silicon ring modulator, wherein a fourth resonant wavelength of the second silicon ring at the first temperature matches the operating wavelength of the first silicon ring modulator.

4. The semiconductor device of claim 3, wherein when the first switch is at the first switching position, the first silicon ring is configured to modulate a light signal having a first wavelength with an RF signal from the first RF circuit, wherein the first wavelength matches the operating wavelength of the first silicon ring modulator.

5. The semiconductor device of claim 4, wherein when the first switch is at the second switching position, the second silicon ring is configured to modulate the light signal having the first wavelength with the RF signal from the first RF circuit.

6. The semiconductor device of claim 1, further comprising the first RF circuit.

7. The semiconductor device of claim 1, further comprising:
a second silicon ring modulator, wherein the second silicon ring modulator comprises:
the first bus waveguide;
a third silicon ring optically coupled to the first bus waveguide;
a fourth silicon ring optically coupled to the first bus waveguide;
a third heater configured to heat the third silicon ring;
a fourth heater configured to heat the fourth silicon ring;
a second switch having a third switching position and a fourth switching position, wherein the second switch is configured to:
at the third switching position, electrically couple the third silicon ring to a second RF circuit; and
at the fourth switching position, electrically couple the fourth silicon ring to the second RF circuit; and
a second heater control circuit configured to control the third heater and the fourth heater such that during operation of the second silicon ring modulator, the third silicon ring and the fourth silicon ring are heated to different temperatures.

8. The semiconductor device of claim 7, wherein the second heater control circuit is configured to:
heat the third silicon ring and the fourth silicon ring to a third temperature and a fourth temperature, respectively, when the second switch is at the third switching position; and
heat the third silicon ring and the fourth silicon ring to the fourth temperature and the third temperature, respectively, when the second switch is at the fourth switching position.

9. The semiconductor device of claim 1, further comprising:
a second silicon ring modulator, wherein the second silicon ring modulator comprises:
the first bus waveguide;
a third silicon ring optically coupled to the first bus waveguide;
a third heater configured to heat the third silicon ring; and
a second switch having a third switching position and a fourth switching position, wherein the second switch is configured to:
at the third switching position, electrically couple the third silicon ring to a second RF circuit; and
at the fourth switching position, electrically couple the second silicon ring to the second RF circuit, wherein the second silicon ring is a backup silicon ring for the first silicon ring and the third silicon ring.

10. The semiconductor device of claim 1, further comprising a second bus waveguide optically coupled to the first silicon ring and the second silicon ring.

11. The semiconductor device of claim 10, wherein during operation of the first silicon ring modulator, the first bus waveguide is configured to receive an input light signal, and the second bus waveguide is configured to output a modulated light signal, wherein the modulated light signal is the input light signal modulated by an RF signal from the first RF circuit.

12. The semiconductor device of claim 1, further comprising:
a first optical power monitor configured to measure an optical power in the first silicon ring; and
a second optical power monitor configured to measure an optical power in the second silicon ring.

13. A semiconductor device comprising:
a first bus waveguide;
a first silicon ring optically coupled to the first bus waveguide;
a backup silicon ring optically coupled to the first bus waveguide, wherein the first silicon ring and the backup silicon ring have a same structure, and have a same resonant wavelength at a same temperature;
a first heater and a second heater configured to heat the first silicon ring and the backup silicon ring, respectively;
a first switch, wherein the first switch is configured to electrically couple the first silicon ring to a radio frequency (RF) circuit when the first switch is at a first switching position, and is configured to electrically couple the backup silicon ring to the RF circuit when the first switch is at a second switching position; and
a heater control circuit configured to:
heat the first silicon ring to a first temperature using the first heater and heat the backup silicon ring to a second temperature different from the first temperature using the second heater, when the first silicon ring is functioning properly; and
in response to detecting that the first silicon ring has failed, heat the first silicon ring to the second temperature using the first heater and heat the backup silicon ring to the first temperature using the second heater.

14. The semiconductor device of claim 13, wherein the first silicon ring has a first resonant wavelength at the first temperature, and has a second resonant wavelength at the second temperature, wherein the first resonant wavelength matches a wavelength of a light signal transmitted in the first bus waveguide during operation of the semiconductor device.

15. The semiconductor device of claim 13, further comprising:
   a first optical power monitor configured to measure an optical power in the first silicon ring; and
   a second optical power monitor configured to measure an optical power in the backup silicon ring.

16. The semiconductor device of claim 13, further comprising a second bus waveguide optically coupled to the first silicon ring and the backup silicon ring.

17. A method of operating a silicon ring modulator having a first ring, a second ring, and a bus waveguide optically coupled to the first ring and the second ring, the method comprising:
   injecting a light signal having a first wavelength into the bus waveguide;
   heating the first ring and the second ring to a first temperature and a second temperature different from the first temperature, respectively, wherein the first ring and the second ring have a same resonant wavelength at a same temperature, wherein a first resonant wavelength of the first ring at the first temperature matches the first wavelength of the light signal;
   modulating the light signal coupled into the first ring by applying a radio frequency (RF) signal to the first ring;
   transmitting the modulated light signal to a receiver;
   monitoring a received signal quality indicator provided by the receiver; and
   in response to detecting that the received signal quality indicator drops below a pre-determined threshold:
      heating the first ring and the second ring to the second temperature and the first temperature, respectively; and
      modulating the light signal coupled into the second ring by applying the RF signal to the second ring.

18. The method of claim 17, further comprising:
   detecting malfunction of the first ring by monitoring a first optical power in the first ring and by monitoring a second optical power in the second ring; and
   in response to detection of the malfunction of the first ring:
      heating the first ring and the second ring to the second temperature and the first temperature, respectively; and
      modulating the light signal coupled into the second ring by applying the RF signal to the second ring.

19. The method of claim 17, further comprising:
   fine-tuning the first temperature and the second temperature based on the received signal quality indicator.

20. The method of claim 17, wherein the received signal quality indicator provides information regarding a bit error rate (BER) measurement, a signal-to-noise ratio (SNR) measurement, or a measurement of eye-opening in an eye-diagram of a demodulated signal at the receiver.

* * * * *